(12) United States Patent
Tan

(10) Patent No.: US 12,486,094 B2
(45) Date of Patent: Dec. 2, 2025

(54) TAMPER EVIDENT SEALABLE BAG ASSEMBLY WITH NOTE TAB AND METHOD

(71) Applicant: PAN PACIFIC PLASTICS MFG., INC., Hayward, CA (US)

(72) Inventor: Hin Siang Michael Tan, Danville, CA (US)

(73) Assignee: PAN PACIFIC PLASTICS MFG., INC., Hayward, CA (US)

( * ) Notice: Subject to any disclaimer, the term of this patent is extended or adjusted under 35 U.S.C. 154(b) by 169 days.

(21) Appl. No.: 18/316,740

(22) Filed: May 12, 2023

(65) Prior Publication Data

US 2023/0365314 A1     Nov. 16, 2023

Related U.S. Application Data

(60) Provisional application No. 63/436,797, filed on Jan. 3, 2023, provisional application No. 63/341,262, filed on May 12, 2022.

(51) Int. Cl.
*B65D 77/14*     (2006.01)
*B65D 30/20*     (2006.01)
(Continued)

(52) U.S. Cl.
CPC ............. *B65D 77/14* (2013.01); *B65D 31/10* (2013.01); *B65D 33/004* (2013.01); *B65D 33/12* (2013.01);
(Continued)

(58) Field of Classification Search
CPC ...... B65D 77/14; B65D 31/10; B65D 33/004; B65D 33/12; B65D 33/18; B65D 33/34; B65D 2401/15
(Continued)

(56) References Cited

U.S. PATENT DOCUMENTS 2,128,196 A     8/1938  Vogel
2,446,001 A  *  7/1948  Elwell .................. B65D 33/004
                                                 229/70
(Continued)

FOREIGN PATENT DOCUMENTS

CN     2347943      11/1999
DE    29500157       2/1995
(Continued)

OTHER PUBLICATIONS

Machine translation of JP-2017186073-A. (Year: 2017).*
(Continued)

*Primary Examiner* — Jes F Pascua
(74) *Attorney, Agent, or Firm* — Beyer Law Group LLP

(57) ABSTRACT

A tamper-evident bag assembly that can be sealed to enclose contents within the bag assembly in a tamper-evident manner. The bag assembly is provided with closure tabs that can be folded over the top edges of the bag assembly and sealed to a side panel of the bag. Strategic portions of the bag assembly can be scored to indicate tampering if unsealing of the adhesive takes place. The bag assembly is also provided with a pull tab designed facilitate opening of the sealed bag assembly to reveal the contents contained therein. When the pull tab is used to open the sealed bag, the bag cannot be re-sealed.

30 Claims, 36 Drawing Sheets

(51) Int. Cl.
*B65D 33/00* (2006.01)
*B65D 33/12* (2006.01)
*B65D 33/18* (2006.01)
*B65D 33/34* (2006.01)

(52) U.S. Cl.
CPC ............ *B65D 33/18* (2013.01); *B65D 33/34* (2013.01); *B65D 2401/15* (2020.05)

(58) Field of Classification Search
USPC ........ 383/5, 30, 31, 62, 78, 84–86.2, 93, 95, 383/98, 99
See application file for complete search history.

(56) References Cited

U.S. PATENT DOCUMENTS

| | | | |
|---|---|---|---|
| 2,669,382 A * | 2/1954 | Poppe | B65D 33/004 |
| | | | 229/72 |
| 2,765,974 A * | 10/1956 | Phipps | B65D 77/12 |
| | | | 383/203 |
| 3,811,613 A | 5/1974 | Harrison | |
| D319,780 S | 9/1991 | Laaki | |
| 5,352,041 A | 10/1994 | Fullerton | |
| 5,407,277 A | 4/1995 | Burke et al. | |
| 5,608,949 A | 3/1997 | Cooley et al. | |
| D501,134 S | 1/2005 | Takahashi | |
| D597,832 S | 8/2009 | Bischoff et al. | |
| 9,630,748 B2 | 4/2017 | Keller | |
| D801,826 S | 11/2017 | O'Connor et al. | |
| D811,896 S | 3/2018 | Wigman | |
| D812,490 S | 3/2018 | Wigman | |
| D821,223 S | 6/2018 | Tan | |
| D828,763 S | 9/2018 | Tan | |
| D830,849 S | 10/2018 | Tan | |
| D864,752 S | 10/2019 | Tan | |
| 10,913,578 B2 | 2/2021 | Tan | |
| D929,238 S | 8/2021 | Chen et al. | |
| D941,677 S | 1/2022 | Chen et al. | |
| D953,878 S | 6/2022 | Palican et al. | |
| 11,377,264 B2 | 7/2022 | Tan | |
| D964,179 S | 9/2022 | Tan | |
| D964,858 S | 9/2022 | Tan | |
| D968,232 S | 11/2022 | Tan | |
| D985,932 S | 5/2023 | Masse et al. | |
| D1,037,866 S | 8/2024 | Israel et al. | |
| 2002/0097924 A1 | 7/2002 | Cappel | |
| 2005/0111765 A1 | 5/2005 | Beaulieu | |
| 2006/0072855 A1 | 4/2006 | Shaw | |
| 2007/0292053 A1 | 12/2007 | Lin | |
| 2008/0240623 A1 | 10/2008 | Bell | |
| 2017/0166358 A1 | 6/2017 | Chandaria | |
| 2019/0112116 A1 | 4/2019 | Su et al. | |
| 2019/0352055 A1 * | 11/2019 | Tan | B65D 33/24 |

FOREIGN PATENT DOCUMENTS

| | | | |
|---|---|---|---|
| DE | 102009007985 | 2/2010 | |
| EP | 0515086 | 11/1992 | |
| EP | 3623316 | 3/2020 | |
| GB | 996098 A * | 6/1965 | ............ B65D 33/12 |
| GB | 2382562 | 6/2003 | |
| JP | 01254557 | 10/1989 | |
| JP | H02-13001 U | 1/1990 | |
| JP | H02-031846 | 7/1990 | |
| JP | H05-042035 Y | 10/1993 | |
| JP | 2017061324 | 3/2017 | |
| JP | 2017186073 | 10/2017 | |
| KR | 20-0214554 | 2/2001 | |
| KR | 10-1935325 | 12/2018 | |
| WO | WO-2019068705 A1 * | 4/2019 | ............ B65D 27/06 |
| WO | WO-2022194657 A1 * | 9/2022 | ........... B31B 70/813 |
| WO | WO-2023044525 A1 * | 3/2023 | ............ B65D 31/00 |

OTHER PUBLICATIONS

Machine translation of JPH-01254557-A (Year: 1989).*
International Search Report and Written Opinion dated Aug. 30, 2023 from International Application No. PCT/US2023/022098.
International Preliminary Report on Patentability dated Nov. 7, 2024 from International Application No. PCT/US2023/022098.
Tan, Design U.S. Appl. No. 29/878,985, filed Jun. 29, 2023.
Tan, Design U.S. Appl. No. 29/909,999, filed Aug. 14, 2023.
Tan, Design U.S. Appl. No. 29/910,513, filed on Aug. 21, 2023.

* cited by examiner

TAMPER EVIDENT SEALABLE BAG ASSEMBLY WITH NOTE TAB AND METHOD

RELATED APPLICATIONS

This application claims priority under 35 U.S.C. § 119(e) from co-pending U.S. Provisional Patent Application No. 63/341,262, filed May 12, 2022, which is entitled "TAMPER EVIDENT SEALABLE BAG ASSEMBLY WITH NOTE TAB AND METHOD", and co-pending U.S. Provisional Patent Application No. 63/436,797, filed Jan. 3, 2023, which is entitled "TAMPER EVIDENT SEALABLE BAG ASSEMBLY WITH NOTE TAB AND METHOD", both of which are hereby incorporated by reference in their entireties.

FIELD OF THE INVENTION

The present invention relates to handled bags, and more particularly, relates to grocery and food service, sealable bags with an integrated note tab.

BACKGROUND OF THE INVENTION

Conventional lunch bag-shaped paper bags have been in use in the food industry since at least the commencement of take-out fast food services. These upper open ended paper bags are easy to open, fill and close, providing simple access to its contents.

More recently, handled paper and plastic bags are becoming more commonly used in food delivery. While the use of these handled paper and plastic bags continues to proliferate in the food service industry, especially with the recent growth of third party food delivery services, the potential for food tampering also increases. Both the food preparer/provider and the consumer would like assurance the food prepared has not in any manner been touched or tampered prior to the delivery, as well as assure the consumer that they received the proper delivery without having to immediately open the sealed delivery bag.

Accordingly, it is desirable to provide a handled paper or plastic delivery bag that is capable of being sealed in a manner that enables the end consumer assurance that the handled bag has not been opened, and that the prepared food therein has not been tampered with. It is also desirable to provide a sealed bag assembly that enables a note, such as a purchase receipt, order ticket, pick ticket, etc., to be easily attached to the sealed bag assembly for simple viewing of the order information such as the order number, consumer identification, order contents, purchase price, date and time, etc.

SUMMARY OF THE INVENTION

In accordance with an embodiment, a tamper-evident bag assembly is provided. The bag assembly includes a first sheet-like panel, a second sheet-like panel, and a sheet-like bottom gusset coupled to bottom edges of the first and second panels. The first sheet-like panel has an interior surface and an exterior surface. The first sheet-like panel also has an upper edge and includes a first upper section that includes an integrally formed upper lateral portion extending laterally above the upper edge. An adhesive is disposed on an interior surface of a distal portion of the upper lateral portion. The second sheet-like panel has an interior surface and an exterior surface. The interior surface of the first sheet-like panel faces the interior surface of the second sheet-like panel. The second sheet-like panel has an upper edge, and the second sheet-like panel includes a second upper section. The first and second upper sections are movable between an opened position and a closed position. The respective interior surfaces of the first and second sheet-like panels and an interior surface of the bottom gusset collectively define a content-receiving region of the bag assembly.

In accordance with another embodiment, a method is provided for making a tamper-evident paper bag assembly. Paper material and a machine to form the bag assembly are provided. The bag assembly is then formed. The bag assembly includes a first sheet-like panel, a second sheet-like panel, and a sheet-like bottom gusset. The first sheet-like panel has an interior surface and an exterior surface, and an upper edge. The first sheet-like panel includes a first upper section that includes an integrally formed upper lateral portion extending laterally above the upper edge, and an adhesive is disposed on an interior surface of a distal portion of the upper lateral portion. A pull tab is integrally formed with the first upper section and is oriented below the upper lateral portion. The pull tab is provided with a gripping tab. The second sheet-like panel has an interior surface and an exterior surface. The interior surface of the first sheet-like panel faces the interior surface of the second sheet-like panel. The second sheet-like panel has an upper edge, and the second sheet-like panel includes a second upper section. The first and second upper sections being movable between an opened position and a closed position. The sheet-like bottom gusset is coupled to bottom edges of the first and second panels, and respective interior surfaces of the first and second sheet-like panels and an interior surface of the bottom gusset collectively define a content-receiving region of the bag assembly.

In accordance with yet another embodiment, a tamper-evident bag assembly is provided. The tamper-evident bag assembly includes first sheet-like panel, a second sheet-like panel, and a sheet-like bottom gusset. The first sheet-like panel has an interior surface and an exterior surface, and an upper edge. The first sheet-like panel includes a first upper section that includes an integrally formed upper lateral portion extending laterally above the upper edge. An adhesive is disposed on an interior surface of a distal portion of the upper lateral portion. A pull tab is integrally formed with the first upper section and is oriented below the upper lateral portion. The pull tab is provided with a gripping tab. The second sheet-like panel has an interior surface and an exterior surface, and the interior surface of the first sheet-like panel faces the interior surface of the second sheet-like panel. The second sheet-like panel has an upper edge, and includes a second upper section. The first and second upper sections are movable between an opened position and a closed position. The sheet-like bottom gusset is coupled to bottom edges of the first and second panels. The respective interior surfaces of the first and second sheet-like panels and an interior surface of the bottom gusset collectively define a content-receiving region of the bag assembly.

In accordance with still another embodiment, a tamper-evident bag assembly is provided. The tamper-evident bag assembly includes first sheet-like panel, a second sheet-like panel, an upper lateral portion, and a sheet-like bottom gusset. The first sheet-like panel has an interior surface and an exterior surface. The first sheet-like panel also has an upper edge and includes a first upper section. The upper lateral portion is adhered to the interior surface of the first upper section and extends laterally above the upper edge of the first sheet-like panel. An adhesive is disposed on an interior surface of a distal portion of the upper lateral portion. The second sheet-like panel has an interior surface and an exterior surface. The interior surface of the first sheet-like panel faces the interior surface of the second sheet-like panel, and the second sheet-like panel has an upper edge. The second sheet-like panel includes a second upper section. The first and second upper sections are movable between an opened position and a closed position. The sheet-like bottom gusset is coupled to bottom edges of the first and second panels. The respective interior surfaces of the first and second sheet-like panels and an interior surface of the bottom gusset collectively define a content-receiving region of the bag assembly.

BRIEF DESCRIPTION OF THE DRAWINGS

The assembly of the present invention has other objects and features of advantage which will be more readily apparent from the following description of the best mode of carrying out the invention and the appended claims, when taken in conjunction with the accompanying drawings, in which:

DETAILED DESCRIPTION OF THE INVENTION

Figure 1:
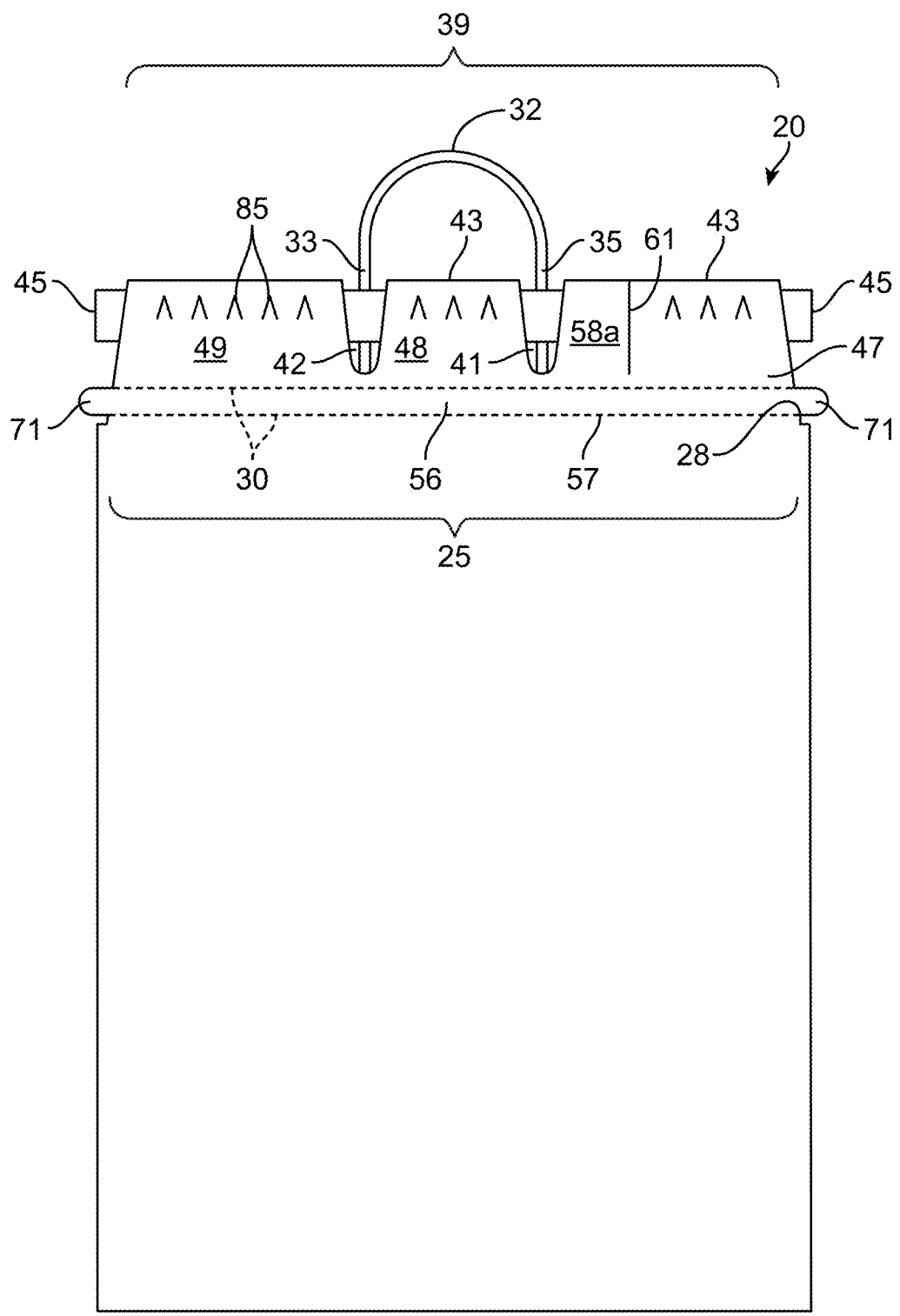
FIG. 1 is a front elevation view of a sealable, handled bag assembly constructed in accordance with the present invention with an upper closure section thereof in an unsealed condition.
Figure 2:
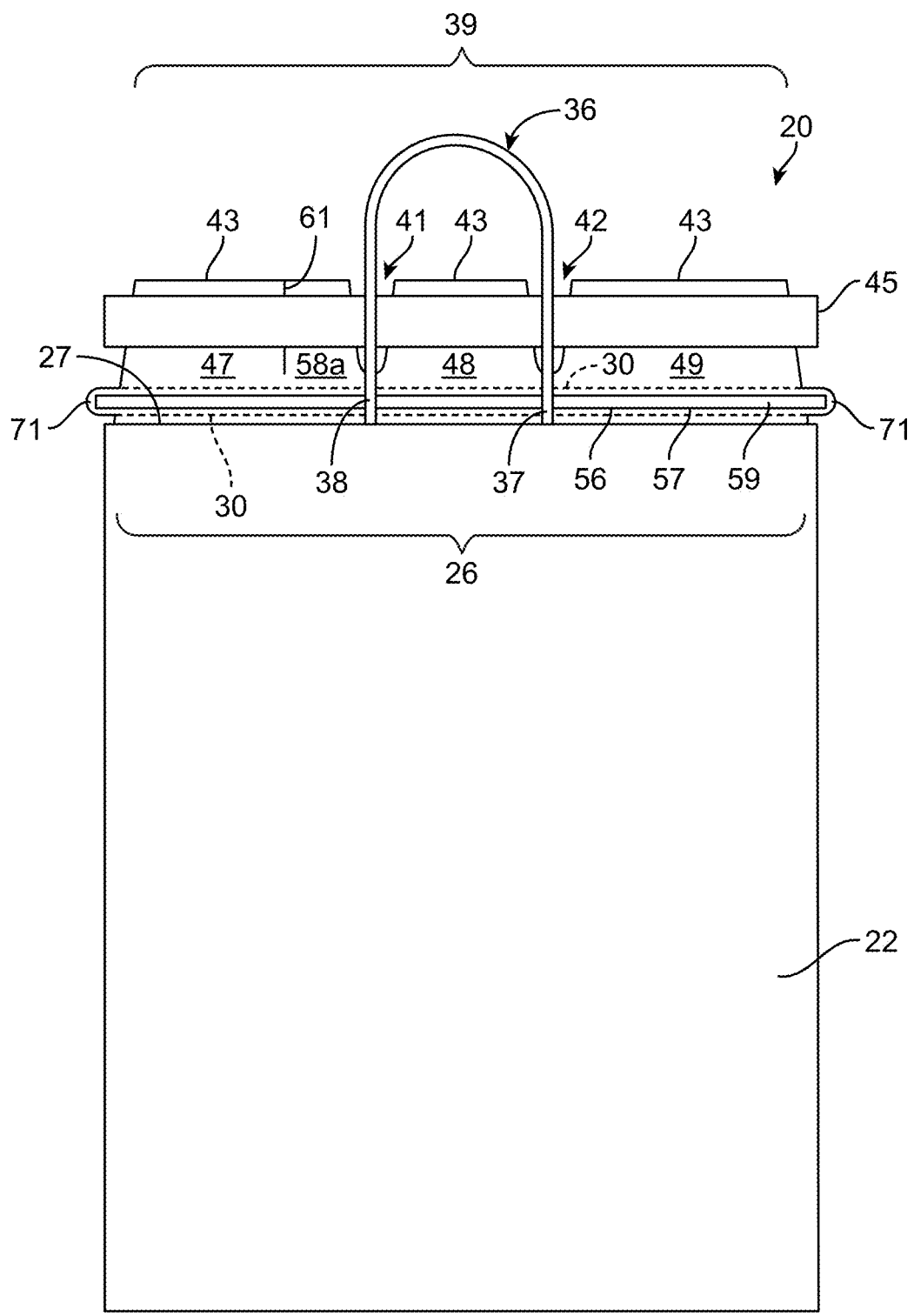
FIG. 2 is a rear elevation view of the bag assembly of FIG. 1.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Figure 5:
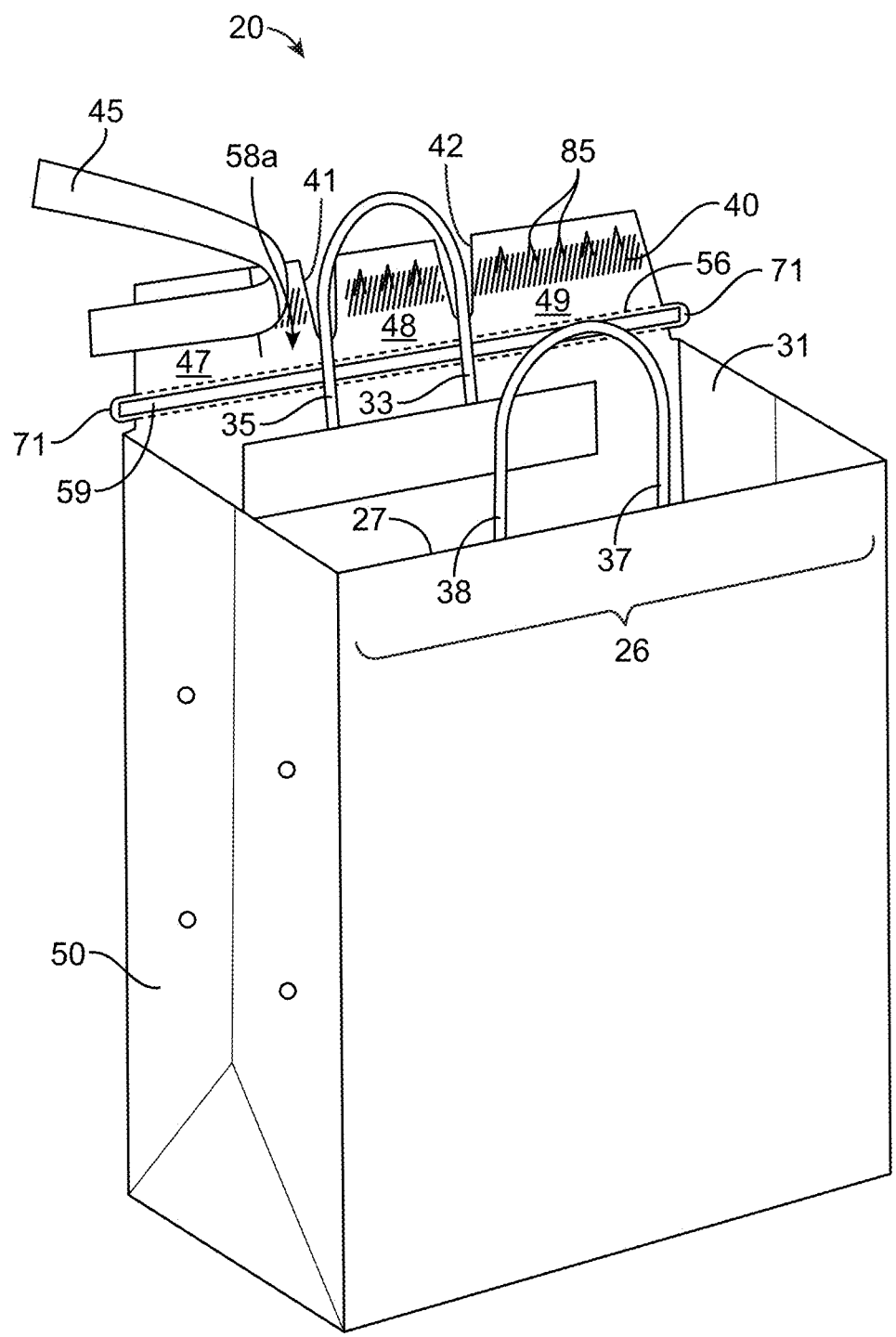
FIG. 5 is a rear perspective view of the bag assembly of FIG. 4.
Figure 6:
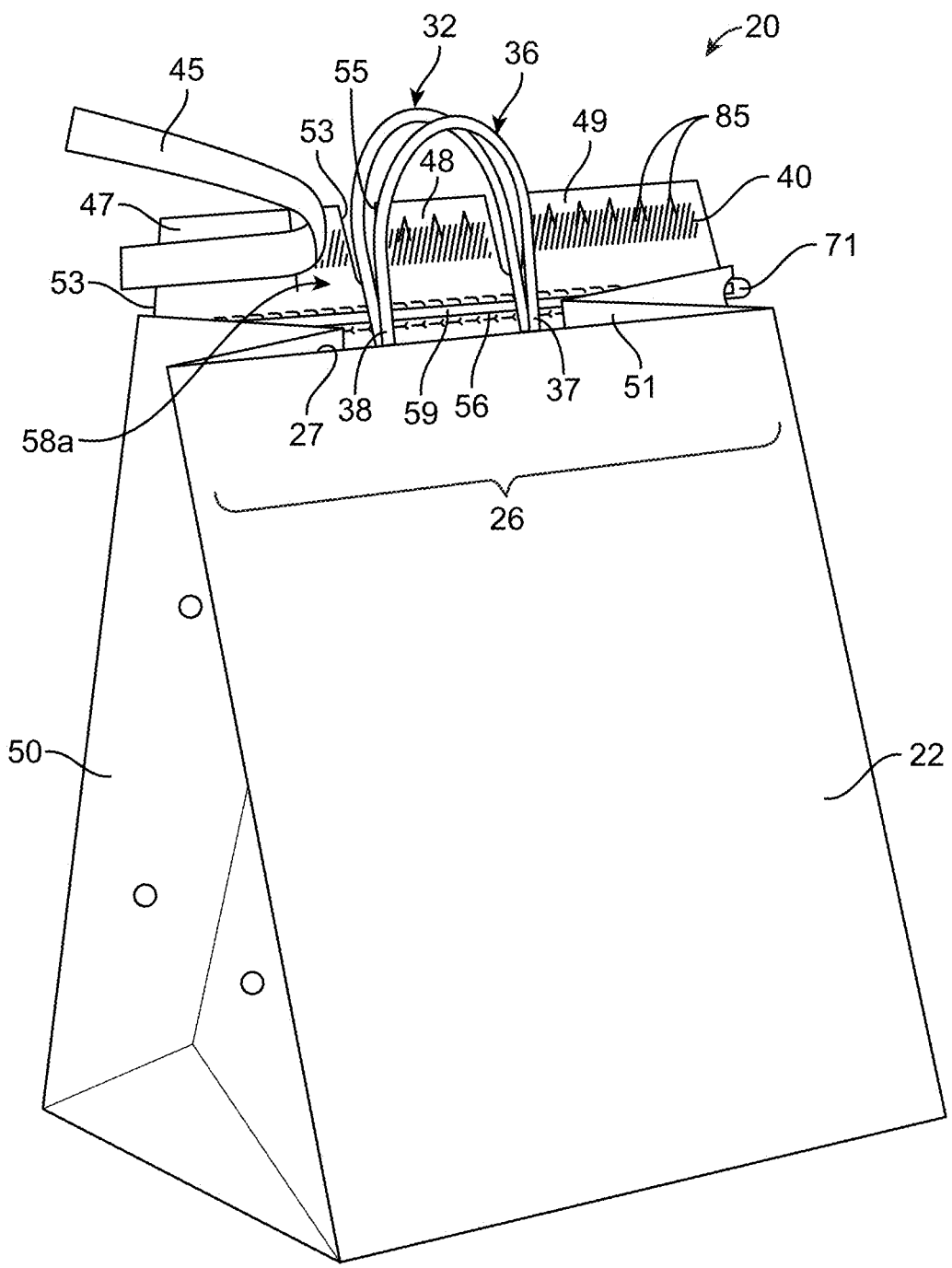
FIG. 6 is a rear perspective view of an alternative embodiment of the bag assembly with the bag upper section moved to a closed condition and the pull tab below the upper lateral portion.
Figure 7:
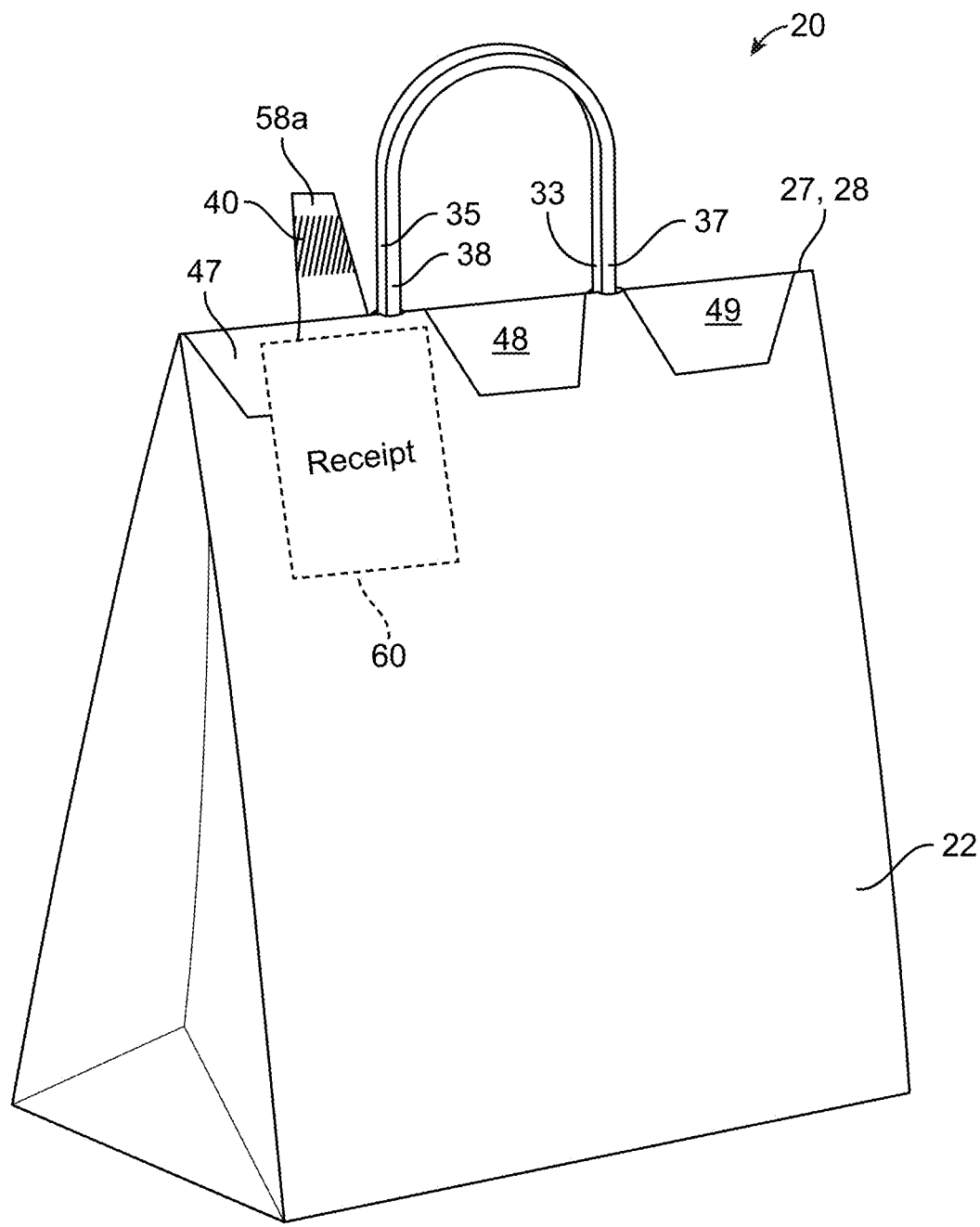
FIG. 7 is a rear perspective view of the bag assembly with the foldable closure sections of the upper lateral portion in a sealed condition while a note tab thereof is oriented in an unmounted condition.
Figure 8:
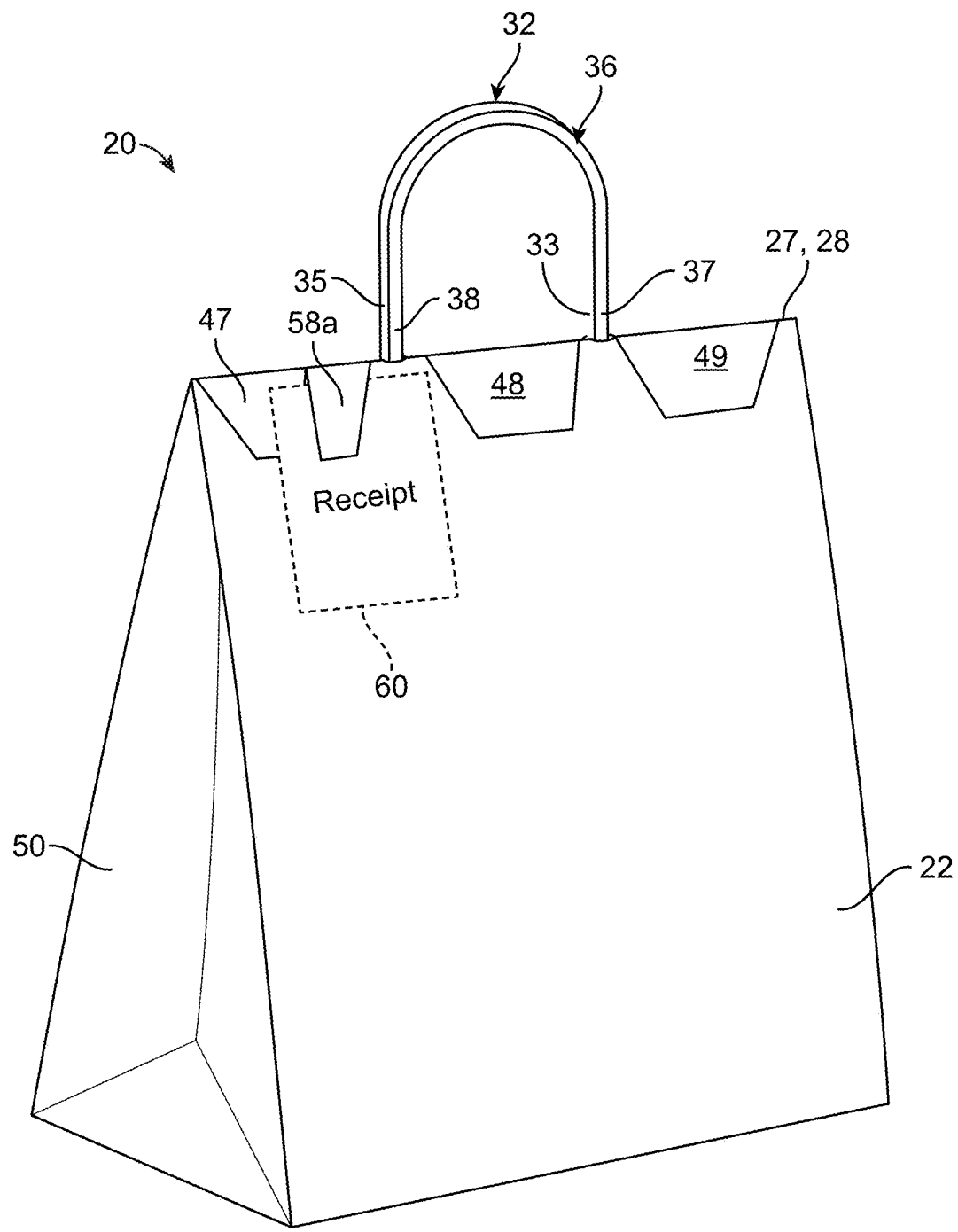
FIG. 8 is a rear perspective view thereof with the note tab moved into adhered contact with the note.
Figure 9:
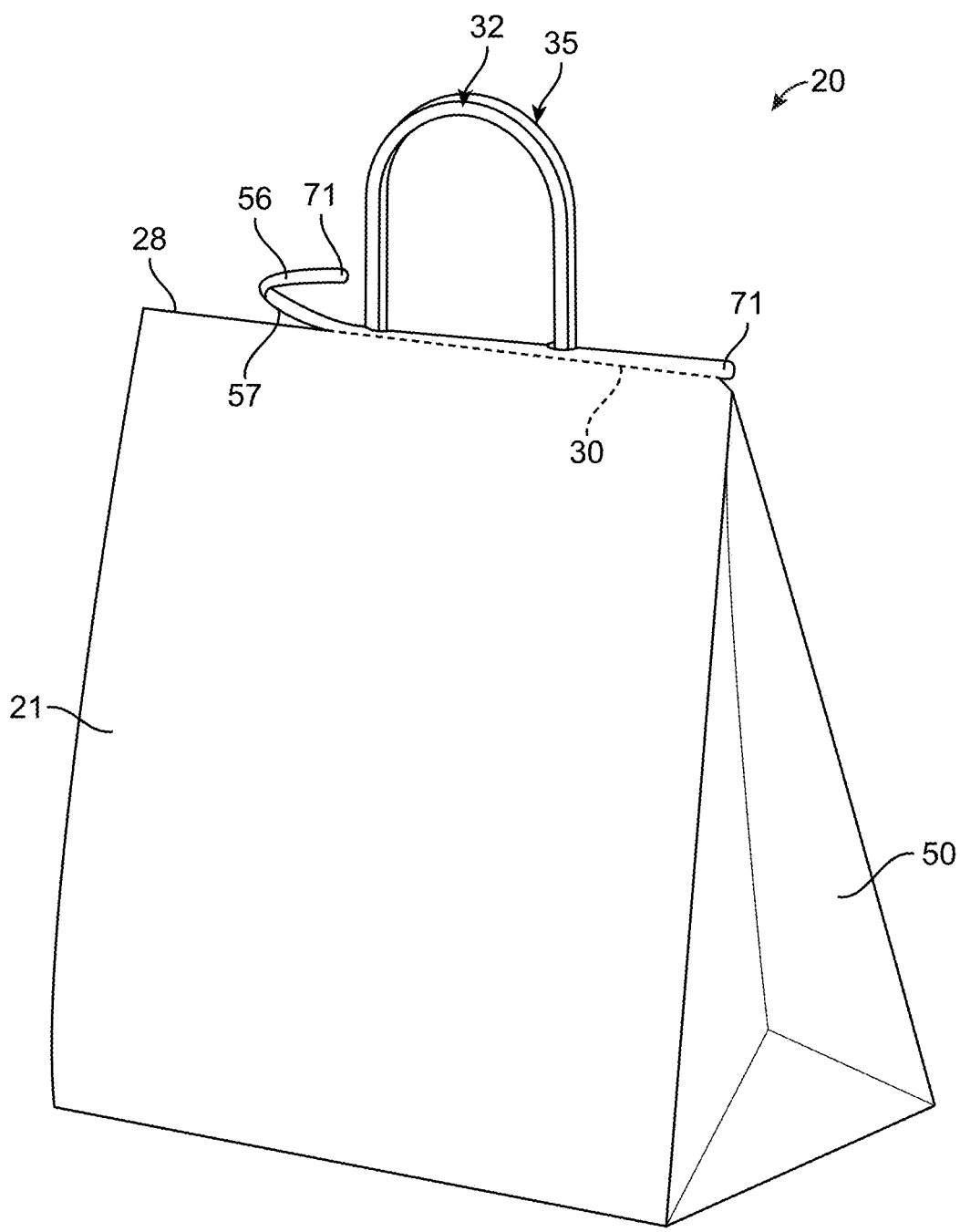
FIG. 9 is a front perspective view of the bag assembly of FIG. 8, illustrating partial removal of a pull tab to aid opening of the bag assembly from the sealed condition.

Turning now to FIGS. 1-10, a tamper evident delivery bag assembly, generally designated 20, is provided having a sheet-like first panel 21, an opposed sheet-like second panel 22, and a bottom gusset 23. Each of the first and second panels 21, 22 has an interior surface that faces the opposing panel and an exterior surface. Moreover, each panel 21, 22 further includes a respective upper section 25, 26, the second upper section 26 that terminates at an upper second edge 27, and the first upper section 25 that terminates at an upper first edge 28 (FIGS. 4, 5 and 10) which is determined by the lower set of the parallel perforations 30, to be described in greater detail in a later section of this specification. The first and second edges 28, 27 cooperating to at least partially define a bag opening 31 (FIGS. 4 and 10) into a content receiving region extending between the bag opening 31, panels 21, 22 and the bottom gusset 23. The upper sections 25, 26 being movable between an opened condition (FIGS. 4, 5 and 10) and a closed condition (FIGS. 7-9), orienting the first and second edges 28, 27 generally in opposed, adjacent, relationship to one another. The bag assembly further includes a first handle 32 mounted to the upper section 25 of the first panel 21, and includes a pair of spaced-apart first leg portions 33, 35 upstanding from the first edge 28. A second handle 36 is also included which is mounted to the second upper section 26 of the second panel 22, and also includes a pair of spaced-apart second leg portions 37, 38 upstanding from the second edge 27. The first and second leg portions 33, 35 and 37, 38 being generally aligned adjacent one another when the upper sections 25, 26 are oriented in the closed condition (FIGS. 7-9).

In accordance with the present invention, the upper section 25 of the first panel 21 includes an upper lateral portion 39 integrally formed with, and extending laterally above, the first edge 28 in an unsealed condition (FIGS. 1-6). At a distal portion of the upper lateral portion 39, a closure adhesive 40 (FIGS. 5 and 6) is disposed on an interior surface thereof facing the second panel 22 when in the unsealed condition. The upper lateral portion 39 includes a pair of substantially V-shaped handle cutouts 41, 42 (FIGS. 1, 2, 4 and 5) strategically aligned with the respective leg portions 33, 35 of the first handle 32, and tapering laterally outwardly from proximate the upper first edge 28 to a distal edge 43 of the upper lateral portion 39. A removable protective strip 45 is provided that covers the adhesive 40, spanning the handle cutouts 41, 42. When the protective strip 45 is removed, and the panel upper sections 25, 26 are aligned in the closed condition, the integral upper lateral portion 39, essentially separated into three closure sections 47-49, can be folded over the second edge 27 of the second panel 22 such that the adhesive 40 is brought into contact with the exterior surface of the second panel 22, substantially sealing the bag opening in a sealed condition (FIGS. 7-9). In this arrangement, the leg portions 33, 35 and 37, 38 of the first and second handles 32, 36 are received through the respective V-shaped handle cutouts 41, 42 of the integral upper lateral portion 39.

Accordingly, a tamper evident delivery bag assembly is provided that can be one-time sealed in a manner that will exhibit visible signs of tampering and destruction should someone attempt to access its contents. This bag assembly is particularly useful in the grocery and food delivery service industry.

Referring back to FIGS. 4-6, the delivery bag assembly 20 includes a fairly conventional handled bag assembly with the sheet-like first panel 21 and the opposed sheet-like second panel 22 either directly joined at the opposed panel side edges, forming common opposed side seams (not shown) or joined at respective panel side edges by an opposed pair of sheet-like, vertically creased, side gussets 50, 51 therebetween. The folded sheet-like bottom gusset 23 is coupled to the bottom edges of the first and second panels 21, 22, and the bottom edges of the opposed side gussets 50, 51. The respective interior surfaces of the first and second panels 21, 22, the side gussets 50, 51, and the bottom gusset 23 collectively define the content receiving region of the bag assembly. Moreover, the pair of opposed handles 32, 36 are preferably provided by conventional twisted loop handles, flat plastic or paper folded handles, rope handles, etc., that are widely available for easy carrying. These handles 32, 36 each include a pair of leg portions 33, 35 and 37, 38 which are mounted to either, the respective interior surface (e.g., FIGS. 4 and 5) or the exterior surface (not shown) of the respective upper sections 25, 26 of the first and second panels 21, 22.

Figure 13:
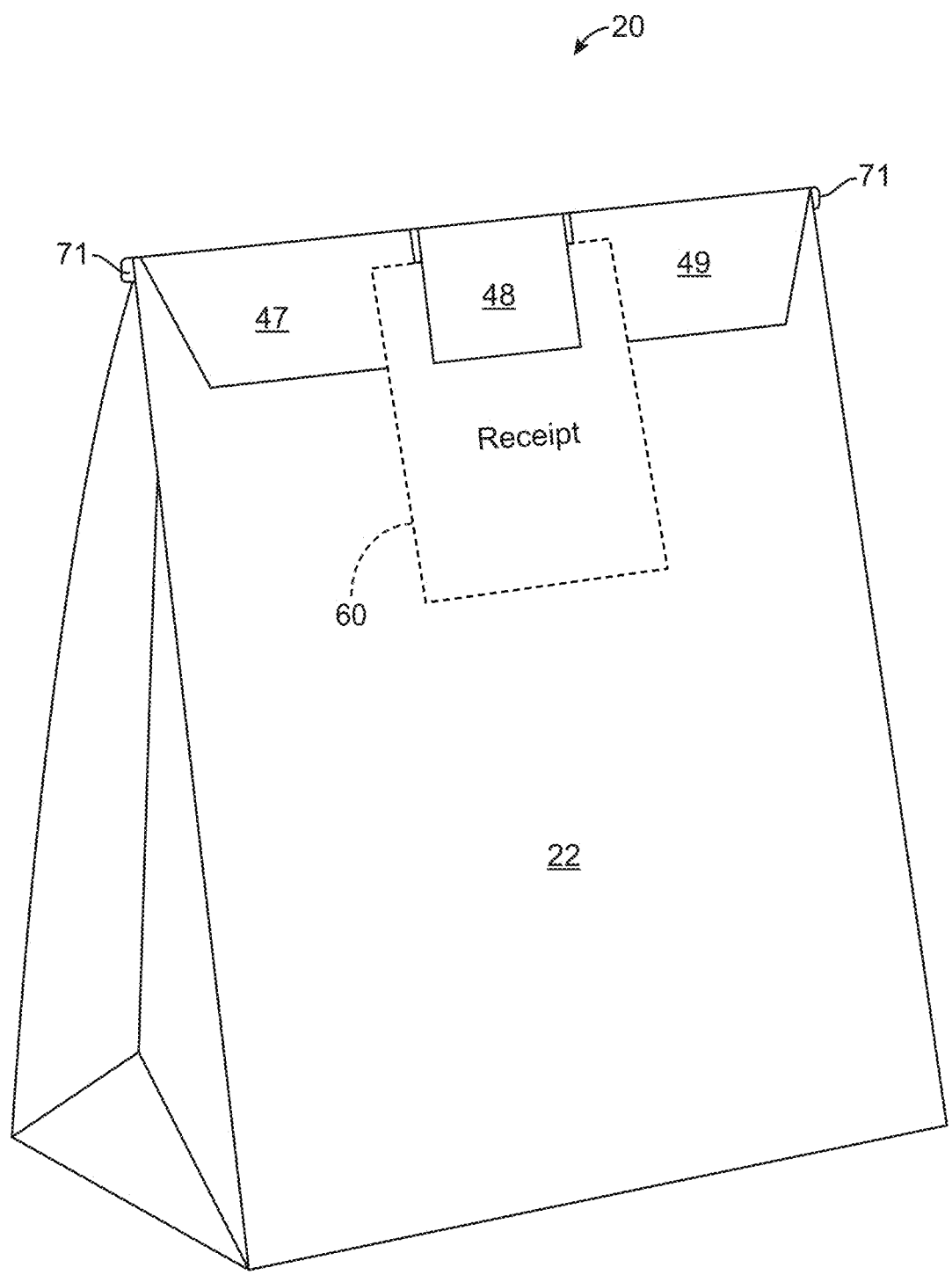
FIG. 13 is a rear perspective view of still another alternative embodiment to the bag assembly of FIG. 1, the bag assembly being handle-less.
Figure 29:
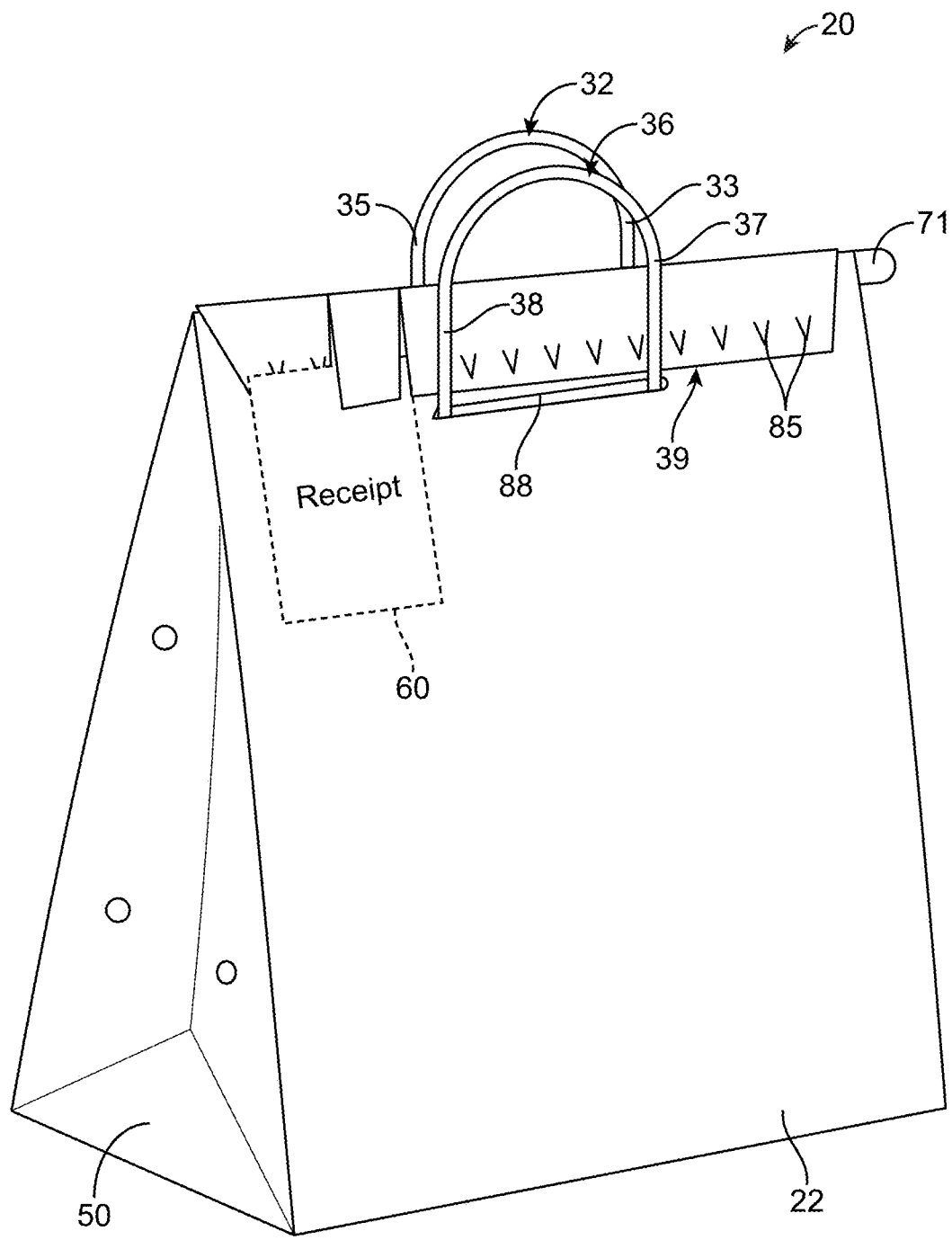
FIG. 29 is a rear perspective view thereof with the foldable closure sections of the upper lateral portion in a sealed condition while a note tab thereof is moved into adhered contact with a note.
Figure 30:
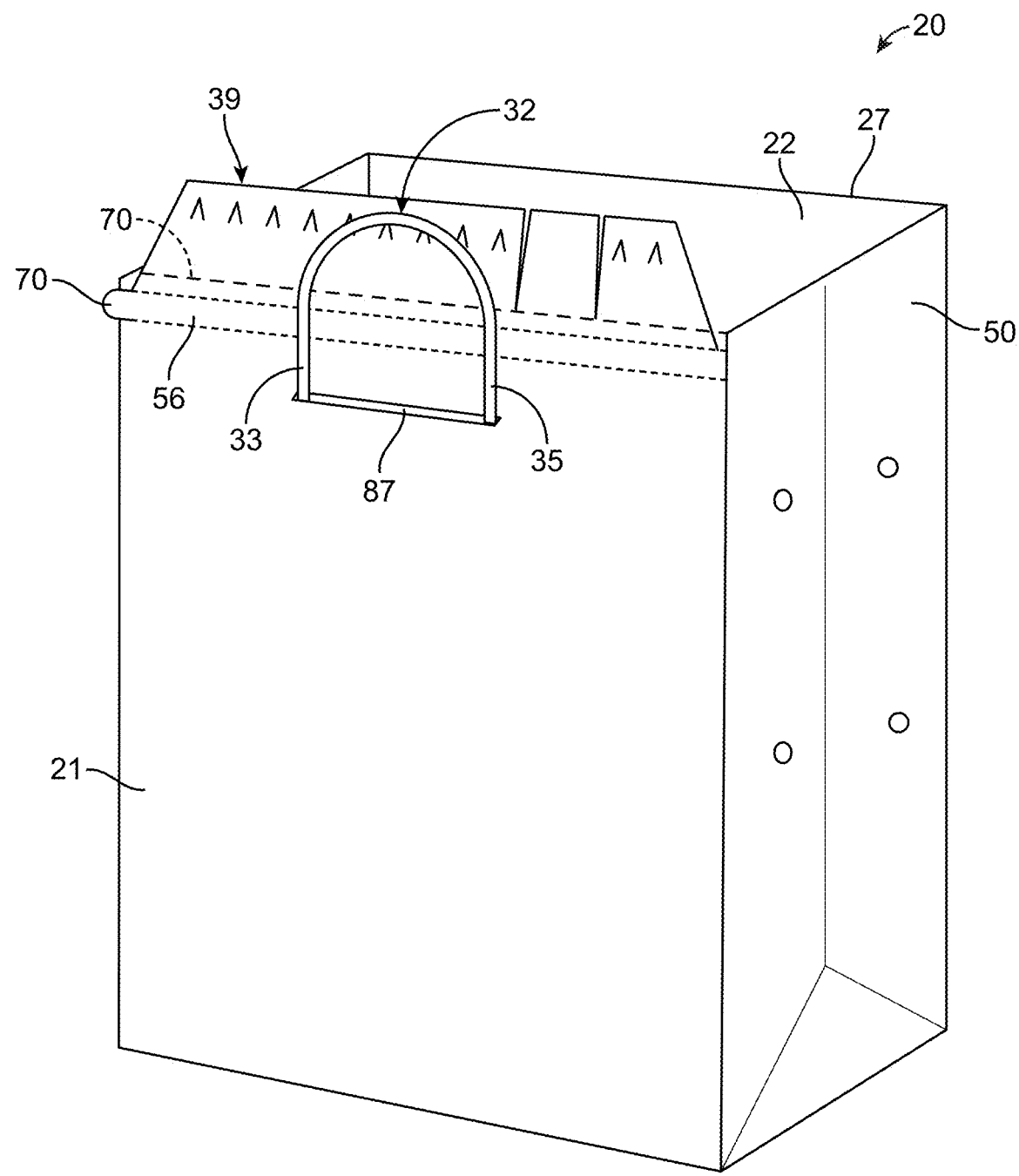
FIG. 30 is still another alternative embodiment of the bag assembly of FIG. 27 with a single handle member extending through a leg passage in the first panels thereof.

Briefly, it will be appreciated that while the present invention is particularly suitable for conventional handled paper bags, this tamper evident seal assembly can be applied to plastic bags as well as any other conventional bag materials utilized in the food delivery industry. Suitable plastic materials include polyethylene terephthalate (PET or PETE), high-density polyethylene (HDPE), polyvinyl chloride (PVC or Vinyl), low-density polyethylene (LIME), polypropylene (PP), polystyrene (PS or Styrofoam), nylon, polycarbonate, polyamide, polyurethane, and polyoxymethylene. Moreover, while the present invention is shown with bag assemblies with two handles, one mounted to each panel, it will be appreciated that the present invention applies to bag assemblies with only a single handle (e.g., only a single handle 32 mounted to the first panel 21, and no second handle 36 mounted to the second panel 22, such as shown in FIGS. 29 and 30). Moreover, the concepts to be described below may even be applied to handle-less bags, as shown in FIG. 13.

The upper lateral portion 39 of the first panel 21 is configured to be folded over the opposing second edge 27 of the second panel 22 when the opening 31 into the bag interior of the bag is positioned in a closed condition (FIGS. 7-9), prior to sealing of the opening in a sealed condition (FIGS. 7-9). It will be appreciated that in this closed position, the opposed first and second edges 28, 27 of the sheet-like first and second panels 21, 22, as well as the handles 32, 36, will be oriented generally parallel to and adjacent one another (FIGS. 6-9).

Referring back to FIGS. 1, 2 and 4-9, to accommodate the lower leg portions 33, 35, 37, 38 of the opposed handles 32, 36 that are mounted to the corresponding first and second panels 21, 22, the upper lateral portion 39 includes corresponding substantially V-shaped handle cutouts 41, 42 aligned therewith. These aligned handle cutouts 41, 42 separate the upper lateral portion 39 into the three independently foldable closure sections 47, 48 and 49, enabling the upper lateral portion 39 to be folded over the corresponding second edge 27 of the second panel 22 despite the lower leg portions of the handle members. Accordingly, once the protective strip 45 is removed (FIGS. 5 and 6), as will be described in greater detail below, the exposed adhesive 40 on each closure section 47, 48 and 49 can be adhered to the corresponding exterior surface of the second panel upper section 26, thereby sealing the bag closed in a sealed condition (FIGS. 7-9).

The foldable closure sections 47, 48, 49 each extend sufficiently above the first edge 28 to easily extend and fold over the opposed second edge 27 when the opposed upper sections 25, 26 of the first and second panel 21, 22 are oriented in the closed condition. The height of the middle closure section 48, however, is sufficiently less than the interior height of the handle members so as to pass unobstructedly under and therethrough. For instance, when the interior height of the handle members are in the range of about 2" to about 6", the height of the middle closure section 48 (and likely the height of the upper lateral portion 39) is in the range of about 1" to about 4" above the first edge 28.

It will be appreciated that the handle cutouts 41, 42 are generally V-shaped and substantially identical to one another. Hence, only one handle cutout 41 will be described herein for clarity. Referring now to FIGS. 1 and 4-6, the V-shaped handle cutout 41 tapers outwardly from a bottom portion 52 of the cutout (proximate to the upper perforations 30) to the upper distal edges 43 thereof. The slope or angle of the handle cutout 41 is determined by the opposed tapered edges 53, 55 of the outer closure section 47 and the adjacent middle closure section 48, respectively. Preferably, the angle of the tapered edges 53, 55 are in the range of about 1 Deg. to about 60 Deg. from a bisecting vertical axis, and more preferably about 5 Deg to about 45 Deg. The angles of the tapered edges 53, 55, however, need not be equal of course.

These tapered edges 53, 55 create a wider opening into the handle cutout 41 to accommodate receipt of the aligned leg portions 33, 37 of the handles 32, 36, respectively, therein. Hence, contact of any portion of the closure sections 47 and 48, and more specifically the closure adhesive 40 thereof, with any portion of the handles 32, 36 is significantly reduced, if not eliminated when the closure sections are moved to the sealed condition. This is beneficial in that any inadvertent contact of the closure section adhesive 40 with the handles 32, 36, while sealing the bag assembly, has been found to leave an adhesive residue on the handle. Furthermore, the middle closure section 48 is more easily passed through the handles 32, 36, unobstructedly, during folded movement toward the sealed condition (FIGS. 7-9).

It will be further understood that width of the narrow bottom portion 52 of the handle cutout 41 can be sized and dimensioned to more snugly receive the aligned leg portions 33, 35 and 37, 38 of the handles 32, 36, when in the sealed condition. Hence, a better seal is formed around the aligned leg portions 33, 37, the bottom portion 52 of the handle cutout 41 and the first and second edges 28, 27 of the respective first and second panels 21, 22 (FIGS. 7 and 8). By providing a better overall seal of the bag assembly opening, tampering access to the content receiving region therethrough is significantly reduced if not eliminated until the seal closure sections are compromised.

To prevent inadvertent closure or contact of the closure adhesive 40 on the closure sections 47-49, the upper lateral portion 39 includes a manually removable protective strip 45 (FIGS. 1, and 4-6). This single protective strip 45 covers the adhesive 40 and horizontally spans the voids created by the V-shaped handle cutouts 41, 42 of the upper lateral portion 39. In this manner, the protective strip 45 can be removed as a single unit rather than removing three separate units. This significantly reduces the time and effort required to remove the protective strip 45 during sealing of the bag assembly 20.

With the adhesives 40 of the closure sections 47, 48, and 49 protected by the protective strip 45, the adhesives 40 can be uncovered when needed by removing the protective strip 45. Generally, however, even when the protective strip 45 is removed (FIGS. 5 and 6) from the upper lateral portion 39, the adhesive 40 will not inadvertently contact the exterior surface of the second panel 22. This will only occur when the first and second edges 28, 27 of the first and second panels 21, 22 are oriented in the closed condition (FIG. 8). Subsequently, the closure sections 47-49 of the upper lateral portion 39 can be independently folded over the second edge 27 of the second panel 22. To seal the bag assembly 20, the closure adhesive 40 of each closure section 47-49 is pushed into contact with the exterior surface of the second panel 22, sealing off the bag opening in the sealed condition (FIGS. 7-9).

Thus, the bag assembly 20 is temporarily closed while retaining the contents in the content receiving region. The closure adhesive 40 of the upper lateral portion 39 will maintain the closure of the bag assembly 20 until forcibly opened and/or torn. Accordingly, a tamper-evident seal is created, assuring both the food preparer/provider and the customer that contents contained in the bag assembly 20 have not been tampered with.

The character and properties of the adhesive of the upper lateral portion 39 is preferably similar to that of the relatively strong adhesives and adhesive tapes used on overnight delivery packages, for instance. That is, the adhesive strength must be sufficiently strong so that any attempt to open the sealed bag assembly would show visible signs of tampering (e.g., stretching, tearing, etc. of the bag material and/or closure adhesive). Suitable closure adhesive tape materials include, for example, 3M® 9086, 9888T, CT6348, 9088, 9088FL, and 55256 double-sided adhesive.

In one configuration, to facilitate opening of the bag assembly 20, from the closed condition (FIGS. 7 and 9), a pull tab 56 is provided with a gripping tab 71 at one end or both opposed ends of the connecting seam 57 between the first upper section 25 of the first panel 21 and the upper lateral portion 39. A plurality of perforations 30, score marks, cuts, etc. are created at the connecting seam 57 to aid tearing thereof when a sufficient force is applied to the pull tab 56 (FIG. 9). Preferably, a pair of parallel perforations 30 (e.g., FIGS. 1-2, 4-6 and 11) are provided which run generally along the longitudinal axis of the connecting seam 57. By fully separating the connecting seam 57 (FIG. 10) from the bag assembly or merely cutting one row of perforations, the bag assembly can be moved to the open position to access the contents. It will be appreciated, of course, that any unauthorized breakage or tearing of the perforations 30 easily show any evidence of tampering due to visual separation of the scoring or perforations should tampering of the upper lateral portion 39 be attempted.

Figure 11:
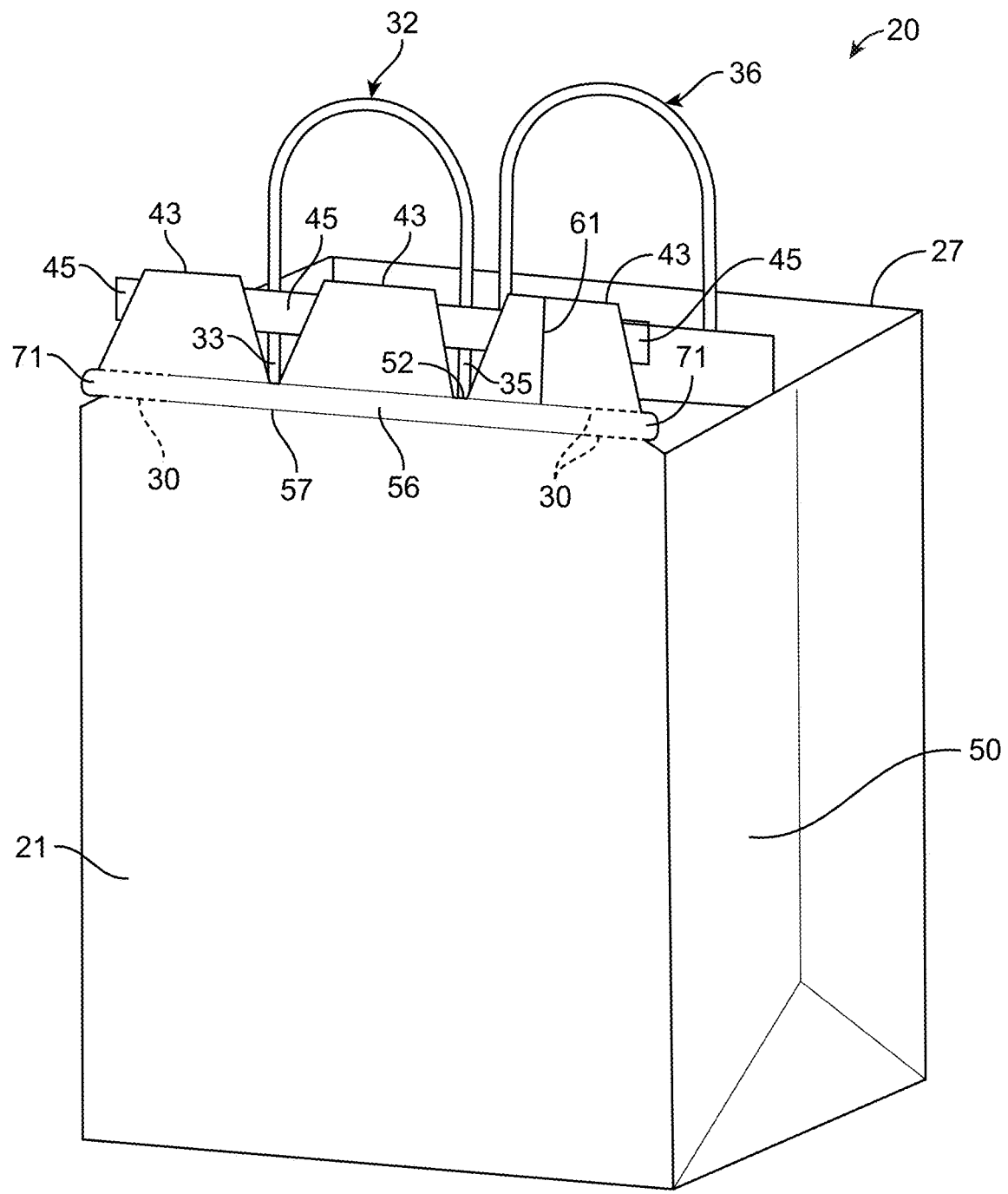
FIG. 11 is a front perspective view of an alternative embodiment to the bag assembly of FIG. 1, having perforations only at the lateral distal ends of the pull tab.

In some embodiments, an elongated plastic strip 59 (FIGS. 2, 5 and 6) may be disposed and adhered to the backside of the connecting seam 57. This plastic strip 59 is significantly stronger than the range of heavy weighted paper applied in most conventional paper bags so as to allow the plastic strip 59 to rip through the connecting seam 57. Hence, due to the robustness of such a plastic strip 59, perforations 30 or scoring might not be necessary, or perhaps only need to be provided near the pull tabs 56 to facilitate commencement of the connecting seam 57 tearing (FIG. 11).

Moreover, the pull tab 56 can be utilized to remove the upper lateral portion 39 from the bag assembly, prior to any use or sealing of the bag, reverting the present invention to a conventional handled bag. Alternatively, the strip 59 does not need to be formed of plastic, but rather a material that is stronger than the material of the panel 21 that is designed to tear through the material of the panel 21, such as a heavier weight paper and fibers formed of nylon, cotton, etc.

As best viewed in FIGS. 1 and 6-11, each of the closure sections 47-49 of the upper lateral portion 39 includes tamper evident V-shaped scoring 85 to exhibit the slightest evidence of tampering. While the closure sections 47-49, in the sealed condition, adequately seal closed the opening of the bag assembly, it is always possible for someone to carefully manipulate and dislodge one or more of the closure sections back to the unsealed condition to gain access to the bag opening, and then subsequently reseal that closure section. While there may be only minor evidence of tampering, those unsuspecting customers may not even notice. Accordingly, as will be described in greater detail below, the V-shaped scoring 85 will easily rip or tear, or even partial tear the scoring 85, clearly indicating evidence of tampering even if only a small amount.

In yet another aspect of the present invention, one of the outer closure sections 47, 49 includes a note tab 58a which is configured to secure a note 60 (FIGS. 7 and 8) or the like, such as a purchase receipt, order ticket or pick ticket to the bag assembly 20. This is very beneficial in that, in one example, the note 60 can be easily adhered to the designated bag assembly for simple viewing information such as the bag contents, consumer identification, order number and delivery destination, especially if the bag assembly 20 has already been sealed.

The respective outer closure section 47 includes a dividing slit 61, dividing the closure section into two portions, one of which creates the note tab 58a. While either divided portion of the closure section 47 can be employed as the note tab, preferably, the innermost divided portion, closer to the aligned leg portions 33, 37 and 35, 38 of the handles 32, 36, is used. Moreover, while the slit 61 can be generally located anywhere along the respective outer closure section to determine the width of the note tab 58a, it should at the very least be located along the upper distal edge 43, and not along the inward tapered edges 53, for example (FIGS. 5 and 6). For instance, the width of the note tab 58a is generally in the range of at about ¼ of the width of the respective closure section to as much as about ¾ the width thereof. Furthermore, while the slit 61 is illustrated as substantially perpendicular to the connecting seam 57, it will be appreciated that it need not be.

Figure 10:
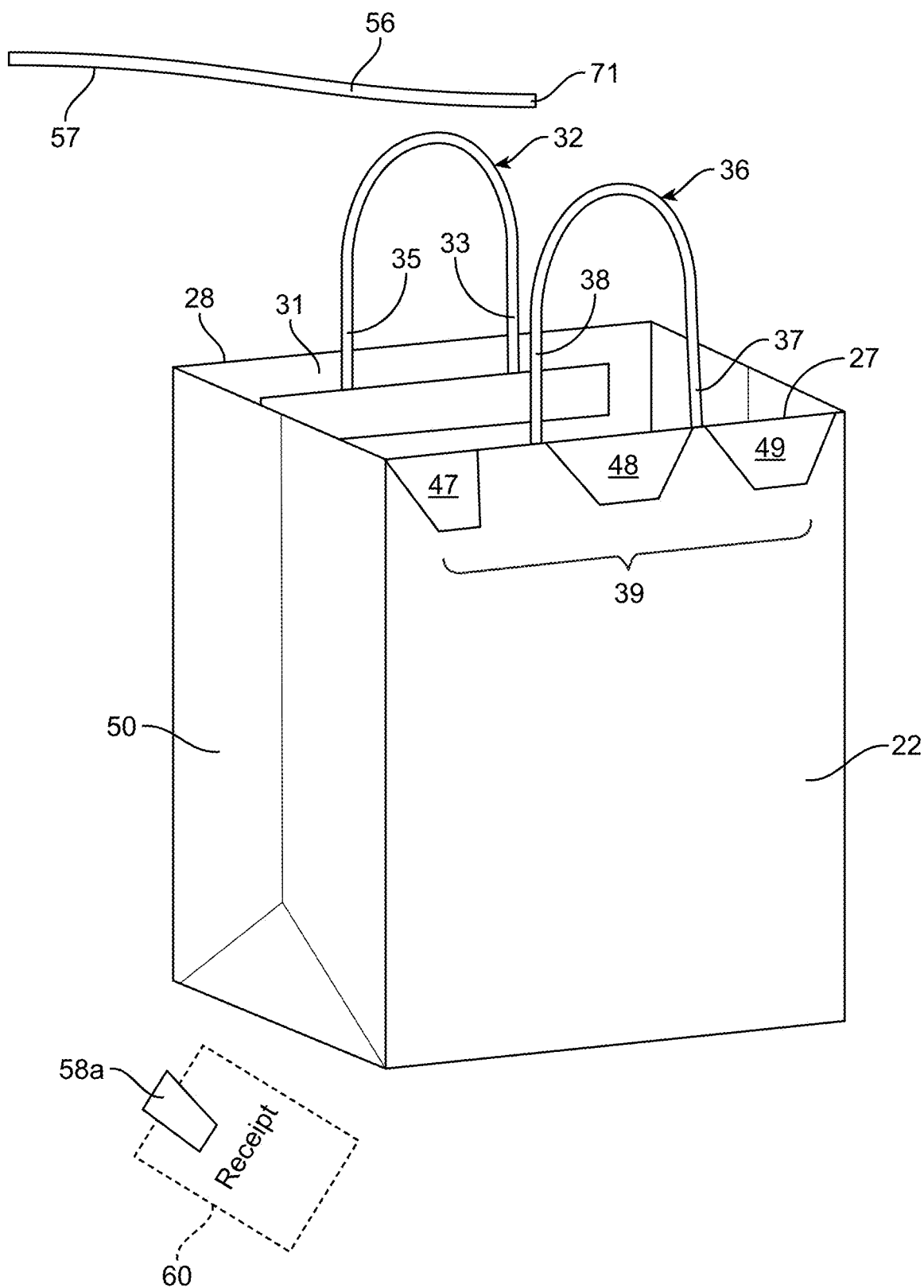
FIG. 10 is rear perspective view thereof, with the pull tab removed, and the bag assembly in an opened condition.

The note tab 58a also includes the same closure adhesive 40 disposed on an interior surface thereof (FIGS. 5 and 6). Initially, when the protective cover 45 is removed from the closure adhesive 40, and the closure sections 47-49 are adhered to the second panel 22, in the sealed condition, the note tab 58a will not be adhered thereto in an unmounted condition (FIG. 7). The note 60 can then be placed between the respective closure adhesive 40 of the note tab 58a and the exterior surface of the second panel 22 (FIG. 7), and the note tab 58a can be pushed into adhered contact with the note, in a mounted condition (FIG. 8). The note tab 58a is generally utilized to only affix to the note 60 and not to the surface of the second panel 22. Accordingly, upon gripping of the gripping tab 71, removal of the pull tab 56 along connecting seam 57 (essentially along the perforations 30) is accomplished as well as removal of the note tab 58a and mounted receipt or note 60 as shown in FIGS. 9 and 10.

Similarly, the vertical height of the note tab 58a can vary in length, although too shallow of a height will render the tab unusable since it may be too difficult to position and adhere the note between the tab adhesive and second panel 22. On the other hand, a note tab 58a that is too tall in height is impractical to use, and wasteful of paper resources. Preferably, the vertical height of the note tab 58a is the same as that of the closure sections 47-49 to simplify manufacture. Thus, as noted above, the height of the closure sections is preferably in the range of about 1" to about 4".

Figure 3:
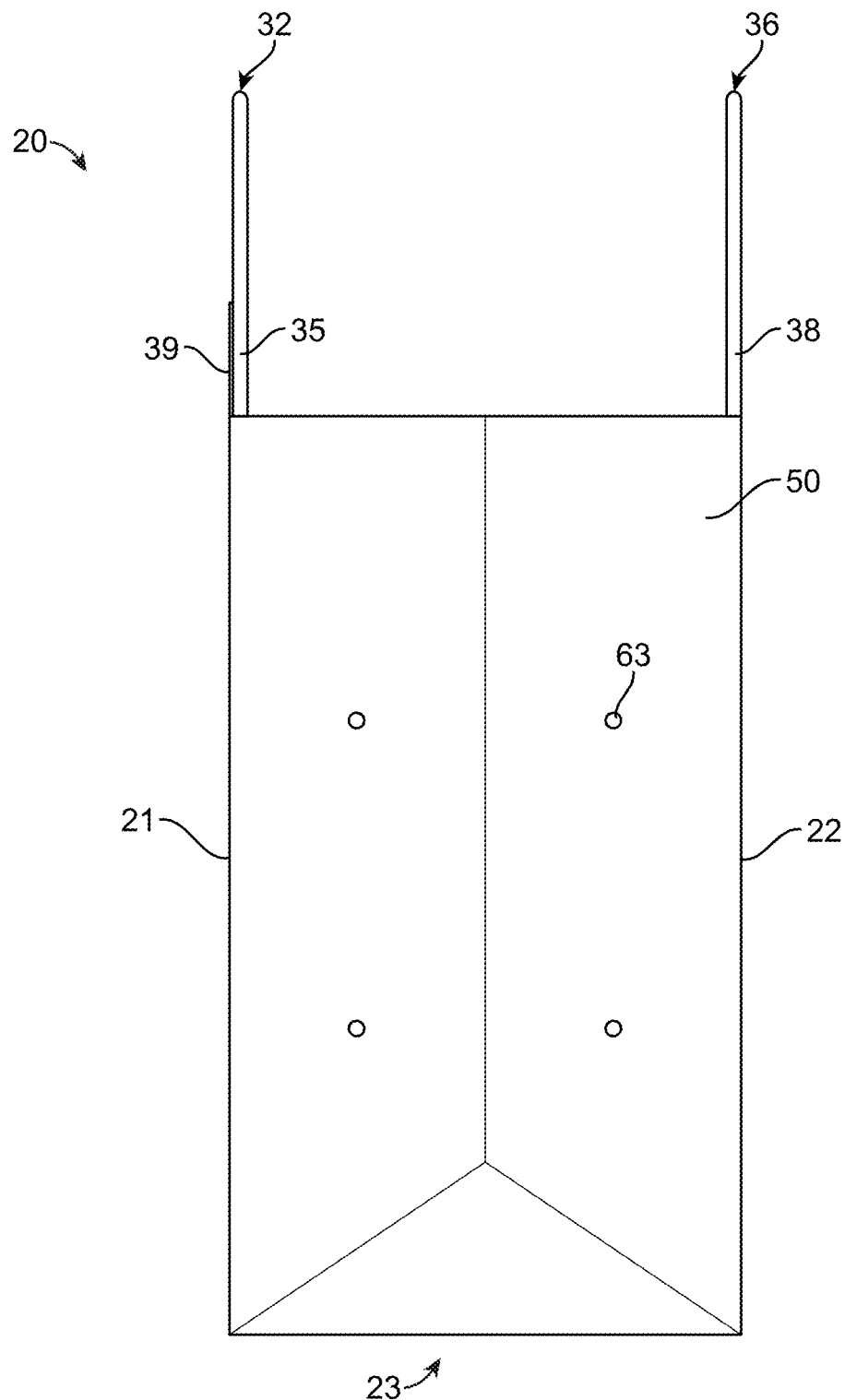
FIG. 3 is a right side elevation view thereof.
Figure 4:
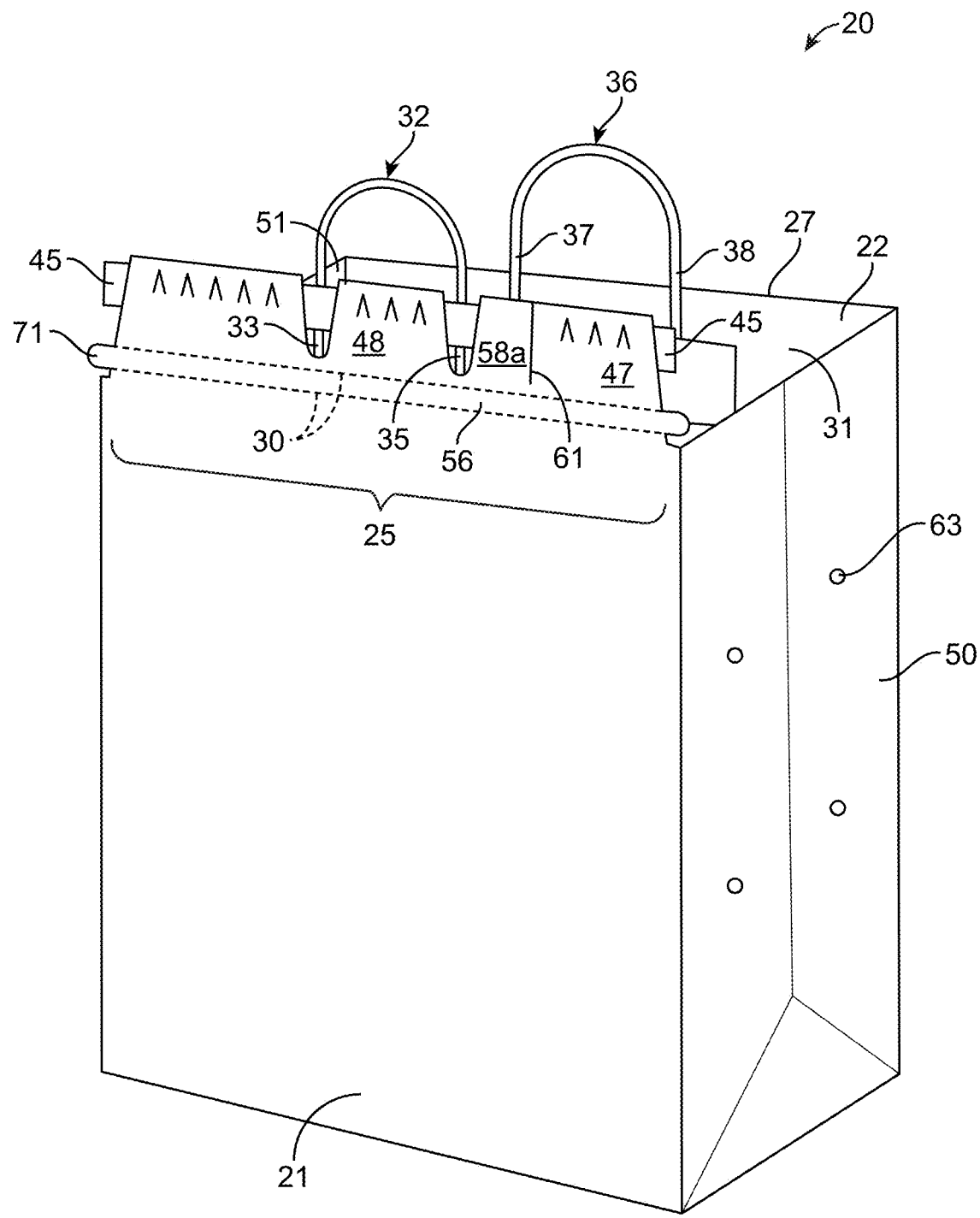
FIG. 4 is a front perspective view of the bag assembly of FIG. 1 with a bag upper section thereof in an opened condition.

Referring back to the embodiment of FIGS. 3, 4 and 5, a plurality of small vent holes 63 can be provided in the first and second panels 21, 22 and/or in the side gussets 50, 51. These vent holes 63, which shown as circular, can be virtually any shape, or scoring. Such venting allows steam or the like emanating from the hot food containers so as to prevent over inflation of the sealed bag assembly or to prevent contained food from getting too soggy.

Figure 12:
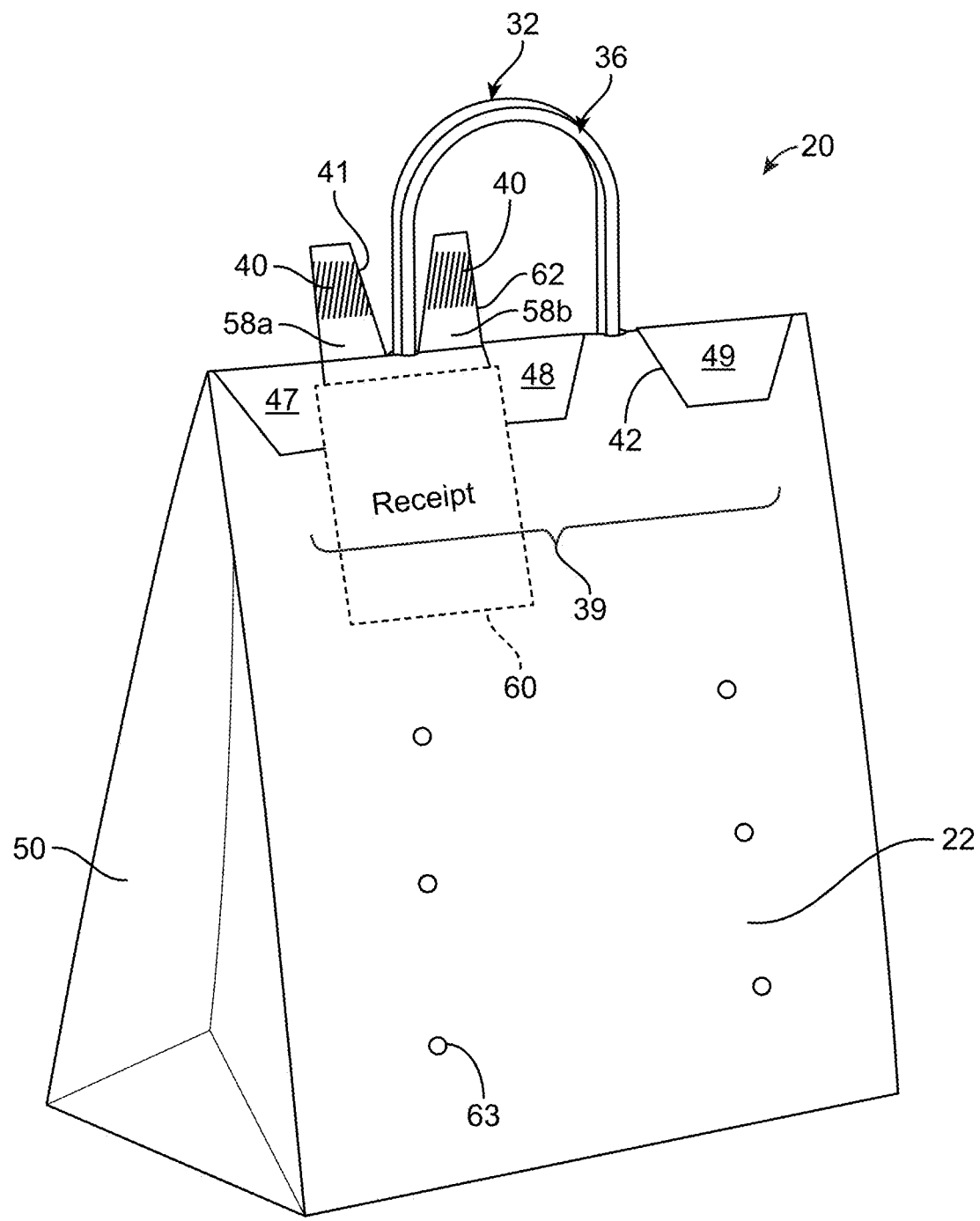
FIG. 12 is a rear perspective view of still another alternative embodiment to the bag assembly of FIG. 1, having dual note tabs in the unmounted condition that cooperate to mount a larger note thereto.

For the most part, only one note tab 58a is incorporated along one of the outer closure sections 47, 49 (FIGS. 1-10). However, a note tab 58b may also be provided by the middle closure section 48 (FIG. 12) if desired. In this manner, a middle slit 62 would be provided, and the corresponding note tab 58b would function similarly to that of note tab 58a. In an alternative embodiment, both tabs 58a, 58b could be employed to secure multiple notes, or one larger note (FIG. 12).

In yet another alternative embodiment, as shown in FIG. 13, the bag assembly 20 may be handle-less, albeit functioning identically to the embodiments above.

Figure 14:
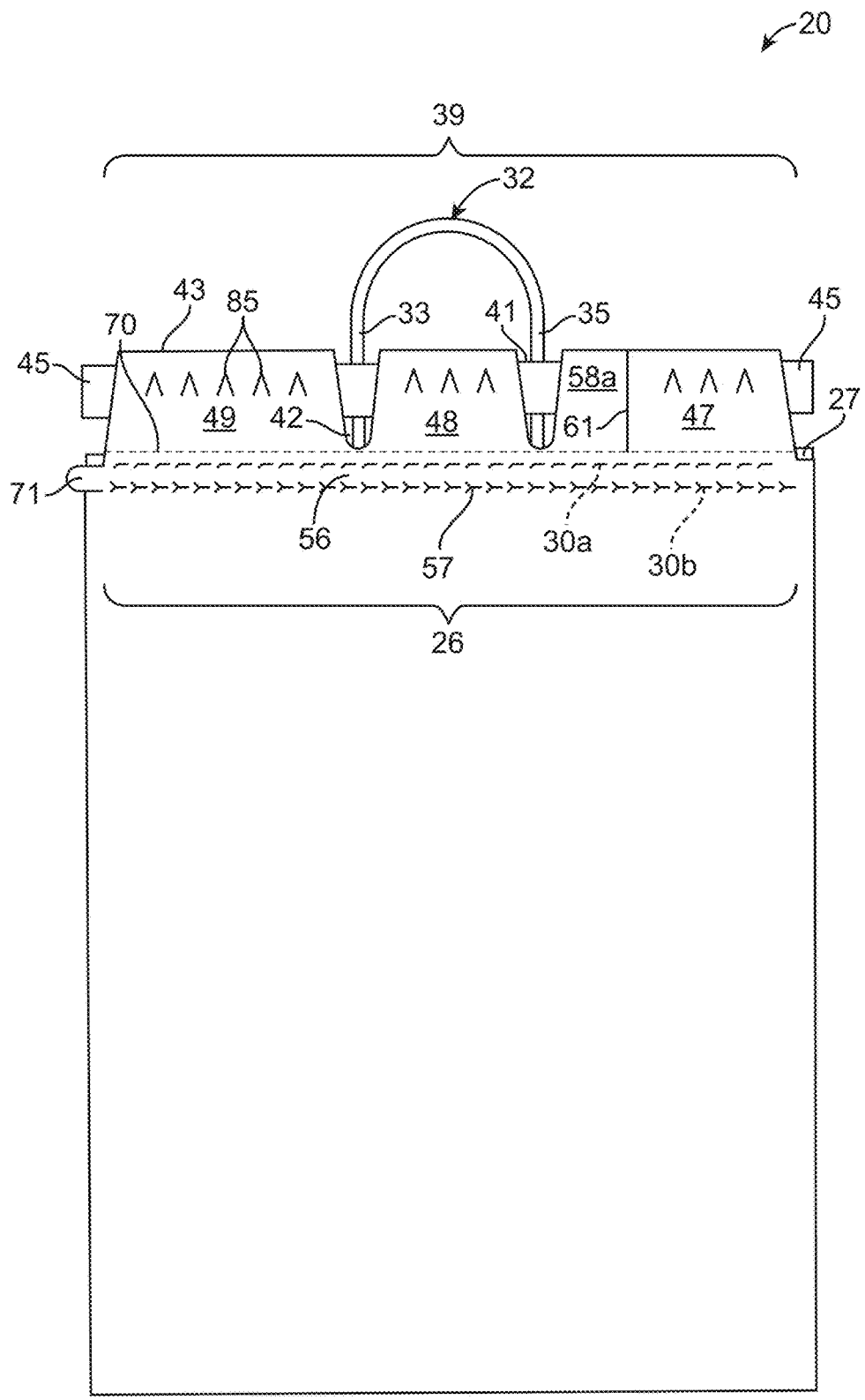
FIG. 14 is a front elevation view is another sealable, handled bag assembly constructed in accordance with the present invention with a pull tab positioned generally below the upper edges of the first and second panels when aligned in a closed condition.
Figure 15:
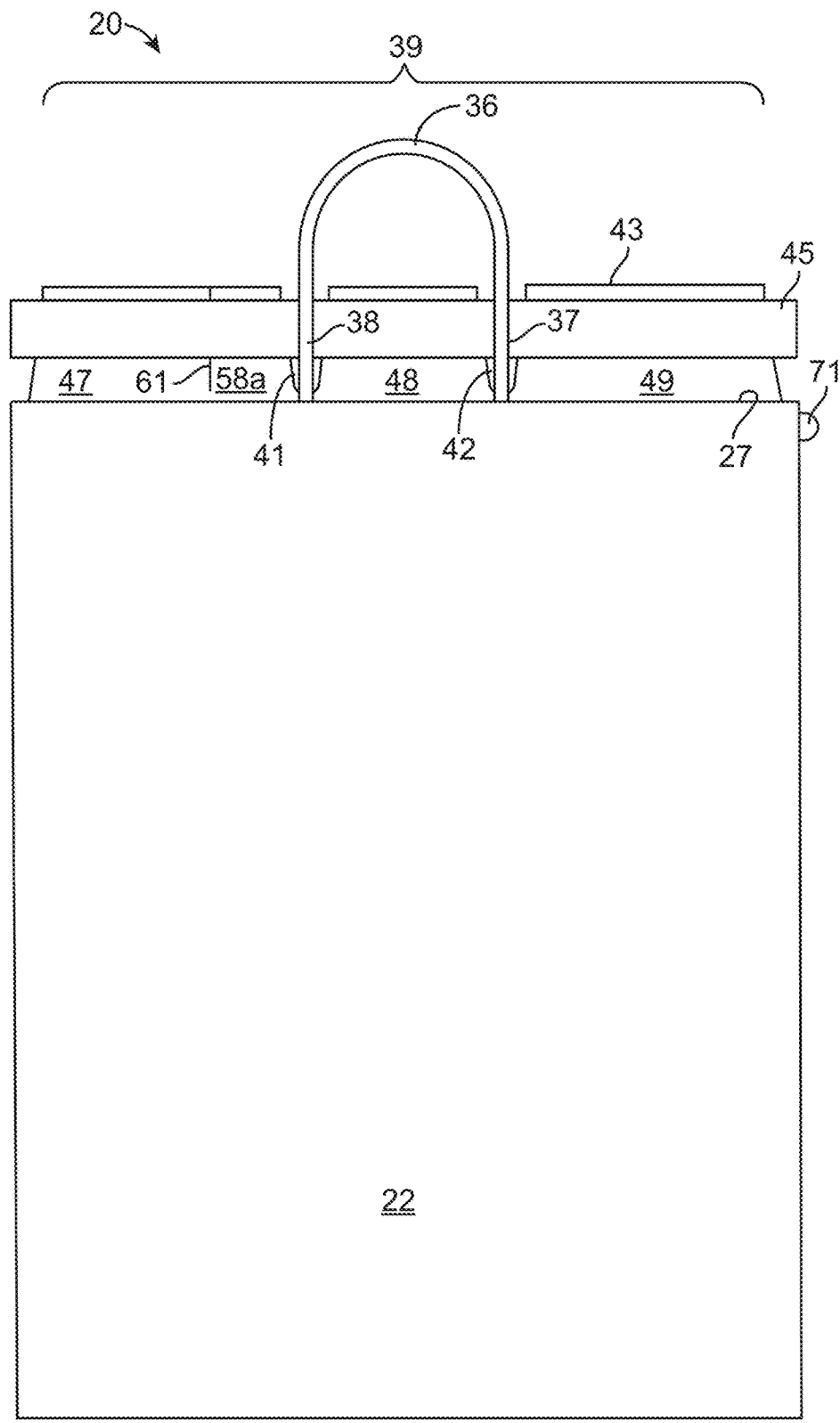
FIG. 15 is a rear elevation view of the bag assembly of FIG. 14.
Figure 16:
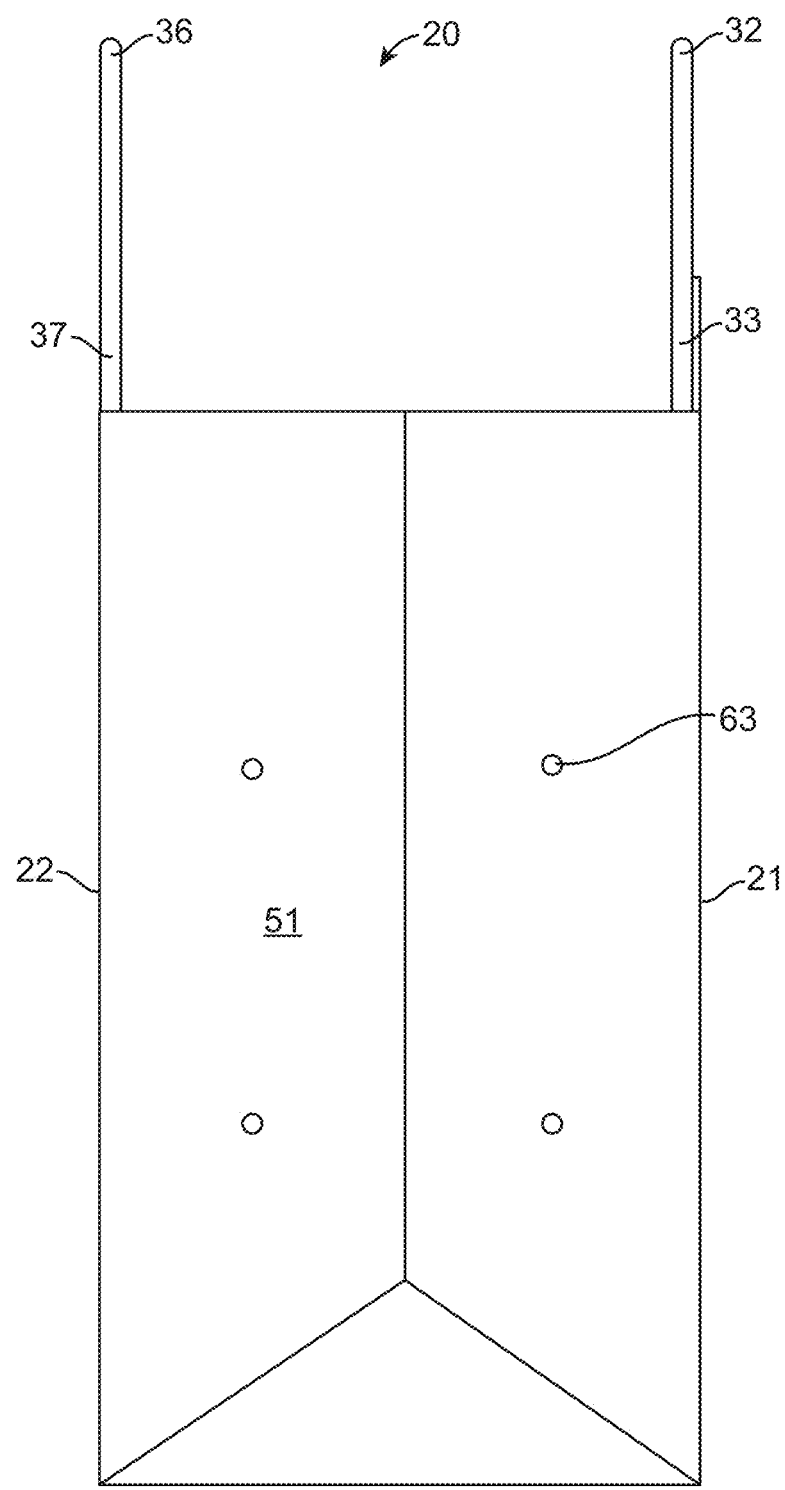
FIG. 16 is a left side elevation view thereof.
Figure 17:
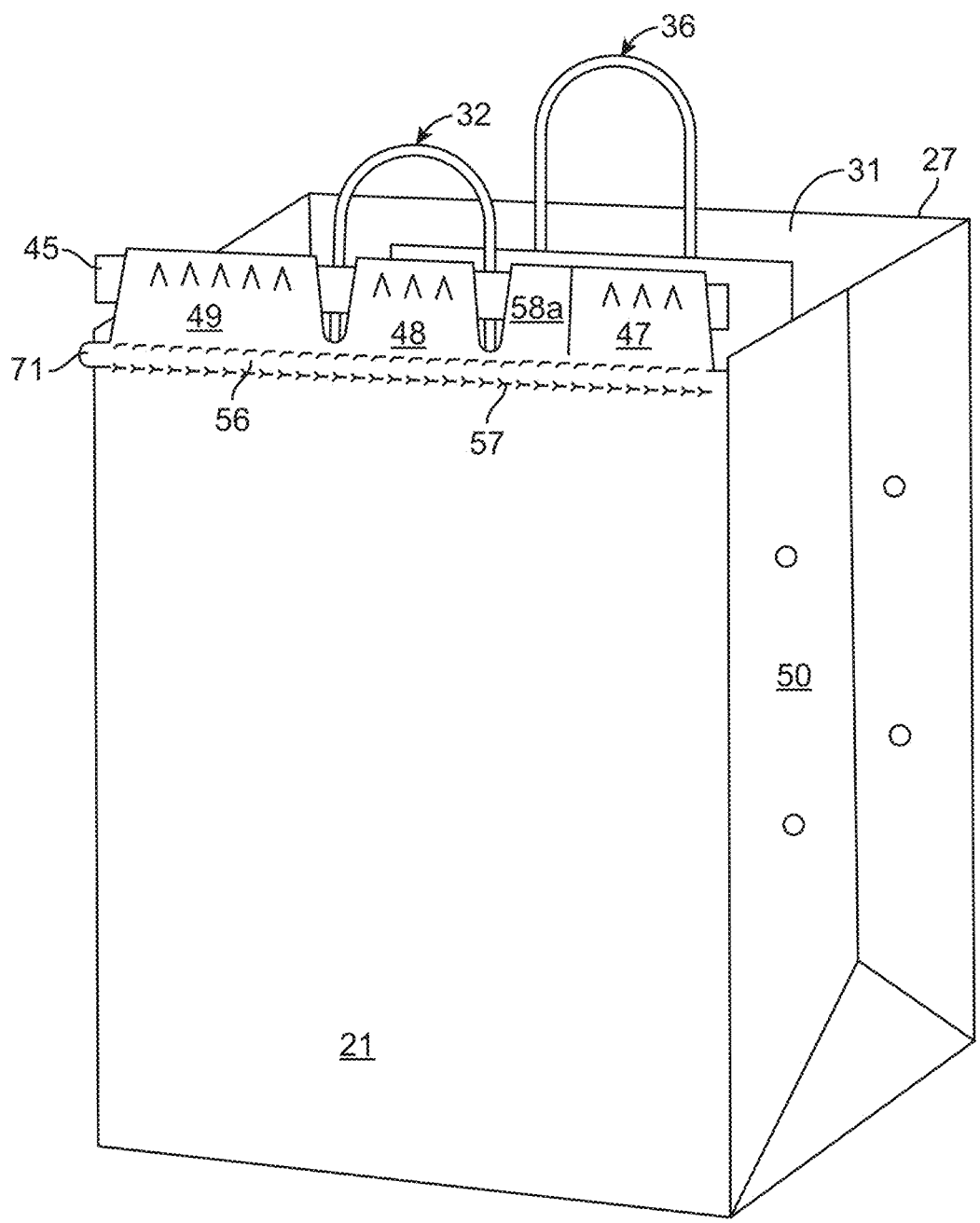
FIG. 17 is a front perspective view of the bag assembly of FIG. 15 with a bag upper section thereof in an opened condition.
Figure 18:
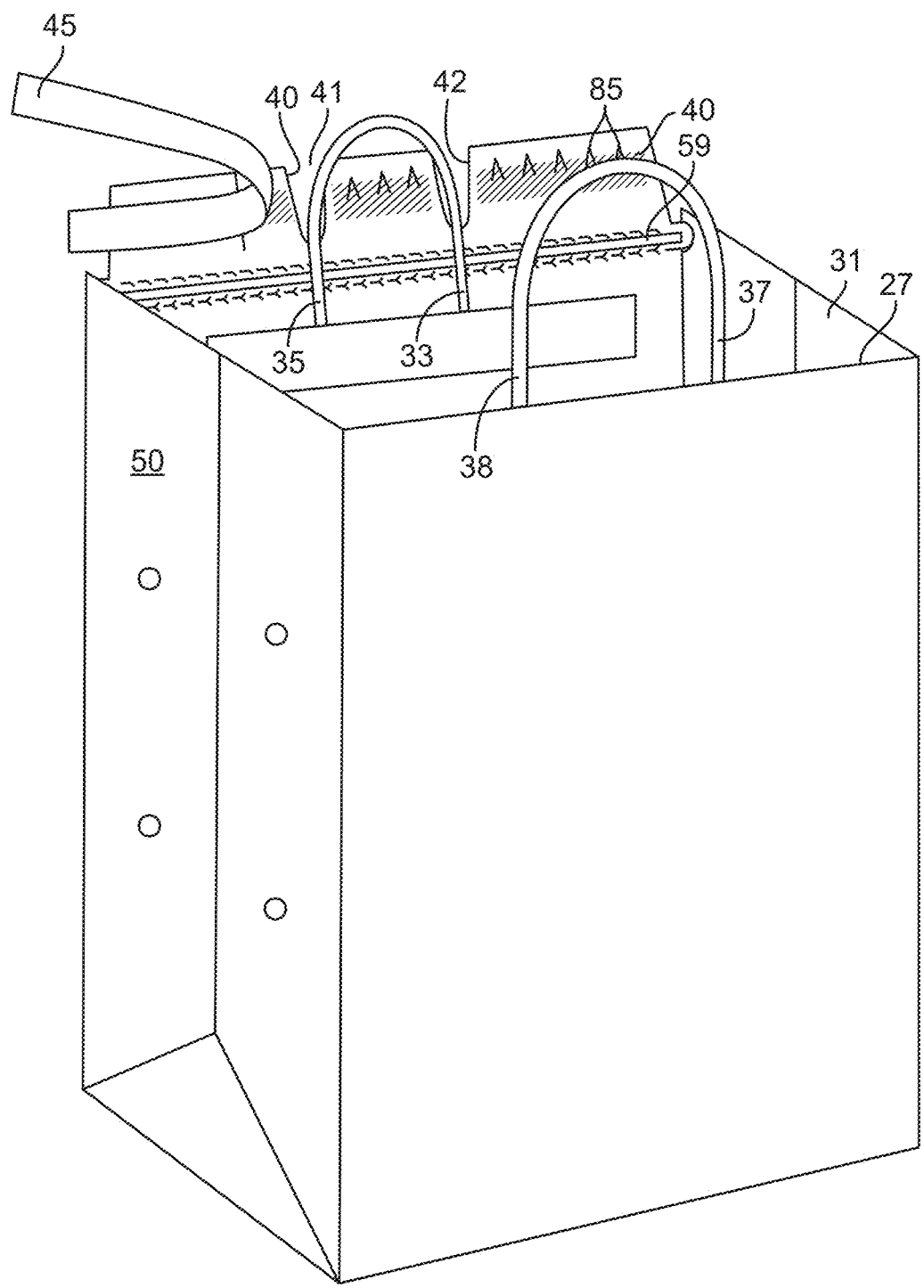
FIG. 18 is a rear perspective view of the bag assembly of FIG. 17, showing partial removal of a protective strip.
Figure 19:
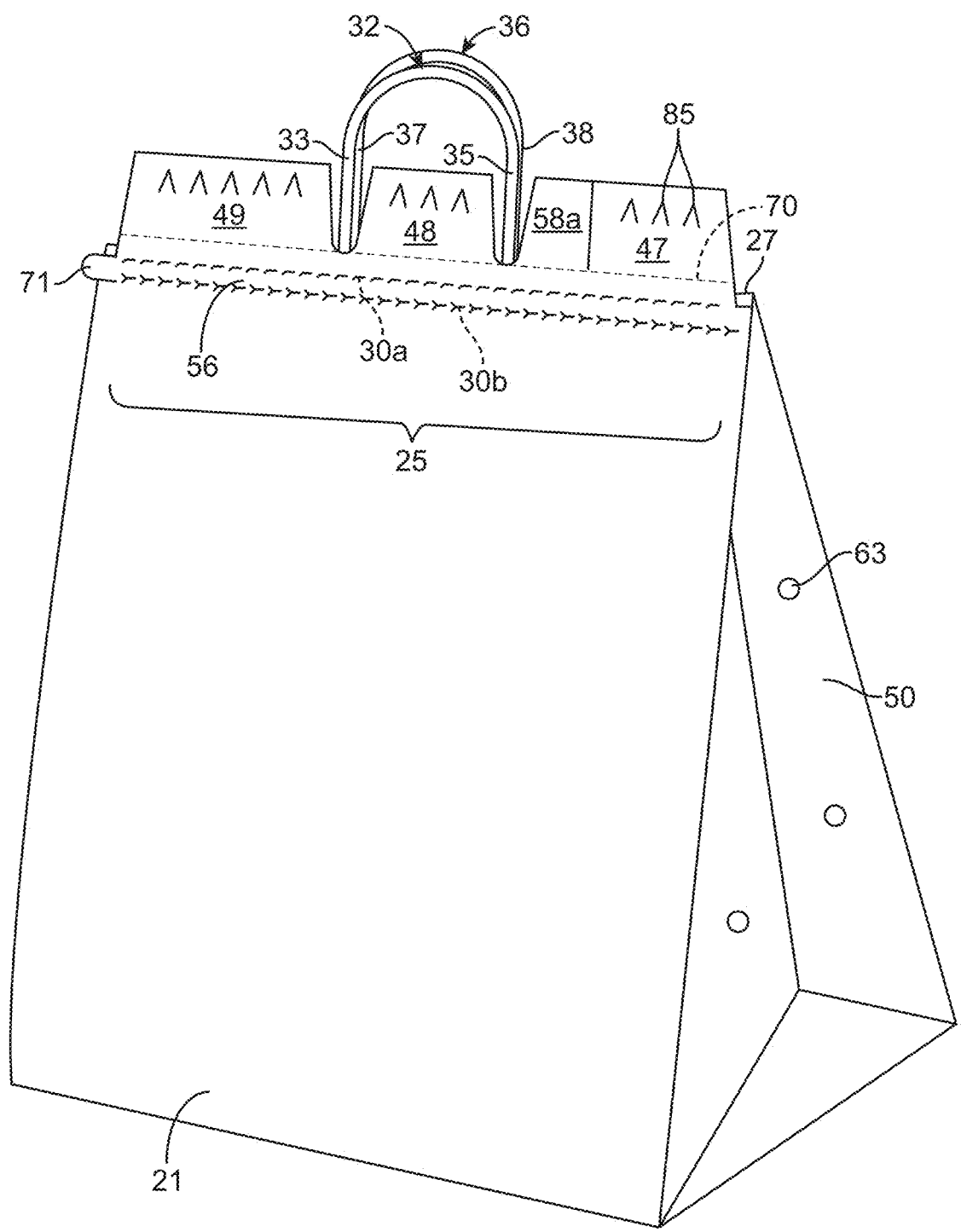
FIG. 19 is a front perspective view of the bag assembly of FIG. 18 with the bag upper section moved to a closed condition.
Figure 23:
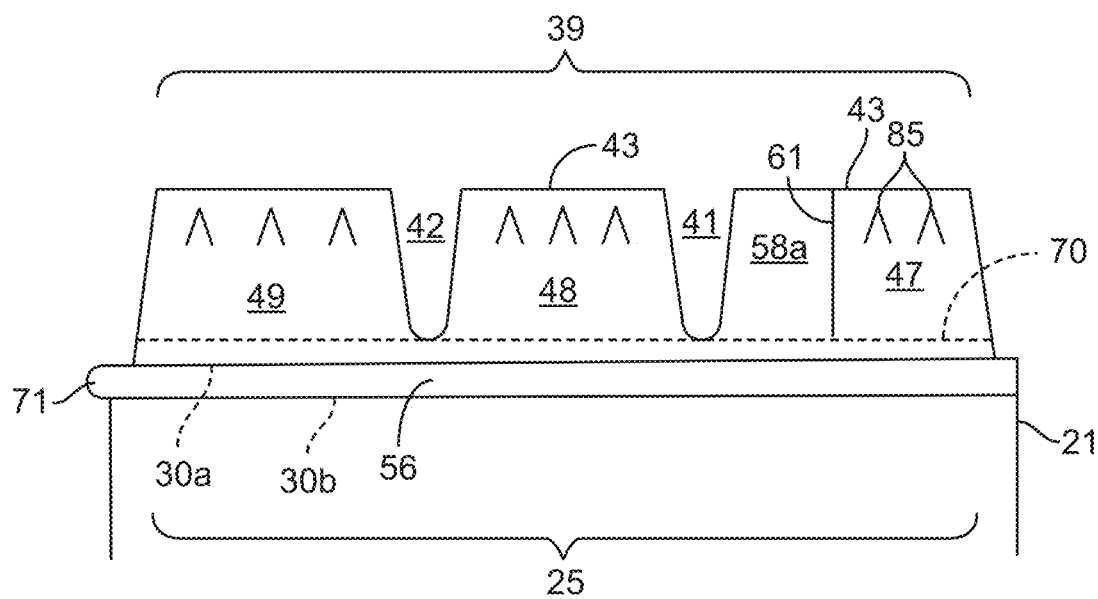
FIG. 23 is an enlarged, fragmentary, front elevation view of an upper portion of a first panel of the bag assembly of FIG. 14.
Figure 24:
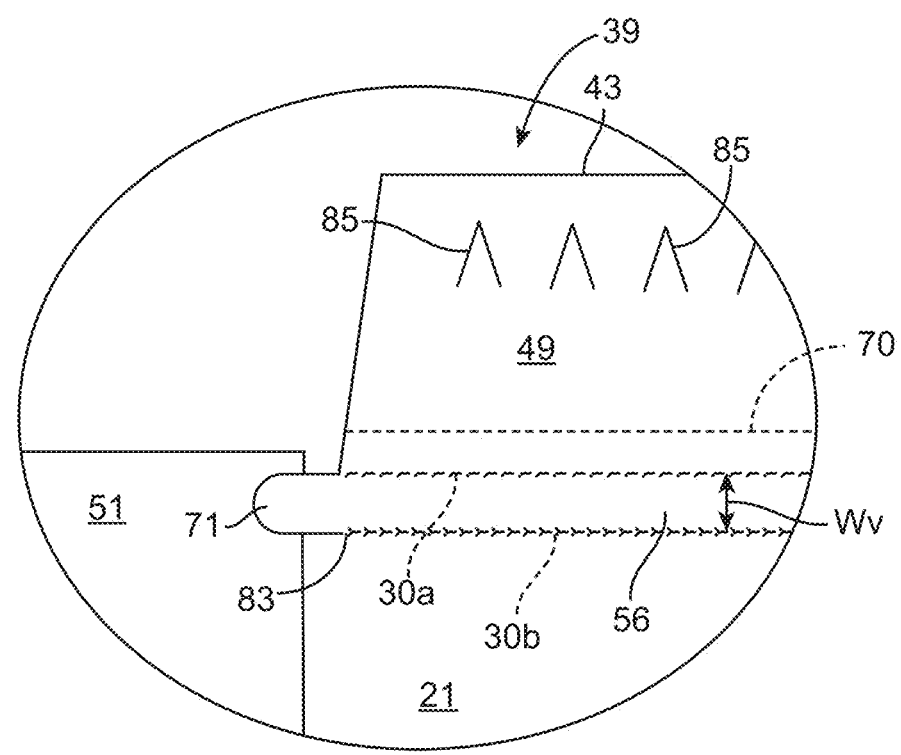
FIG. 24 is an enlarged, fragmentary, front elevation view of a left side of the upper portion of a flattened first panel and left side gusset of FIG. 23.

The bag assembly 20 is particularly suitable for fabrication from a roll of paper \ or a single sheet of paper. In this particular embodiment, the pull tab 56 is positioned in, and integral with, the first upper section 25 of the first panel 21 (FIG. 14). As best shown in FIGS. 14, 23 and 24, the pull tab 56 is oriented below the upper lateral portion 39, when in the unsealed condition, rather than positioned in, and integral with, the upper lateral portion 39 that characterizes the embodiments shown in FIGS. 1-11.

Figure 20:
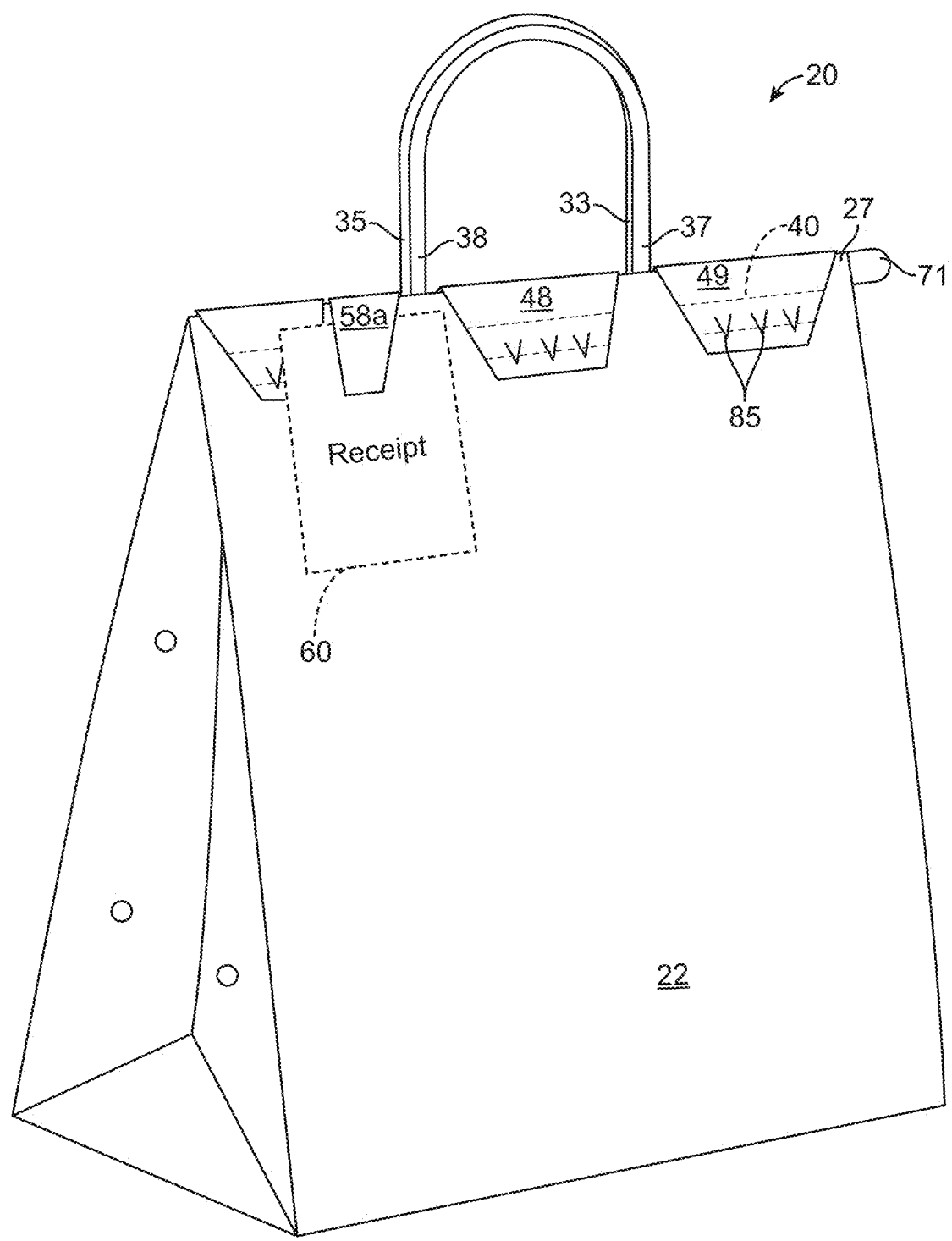
FIG. 20 is a rear perspective view of the bag assembly of FIG. 19 with the foldable closure sections of the upper lateral portion in a sealed condition while a note tab thereof is moved into adhered contact with a note.
Figure 21:
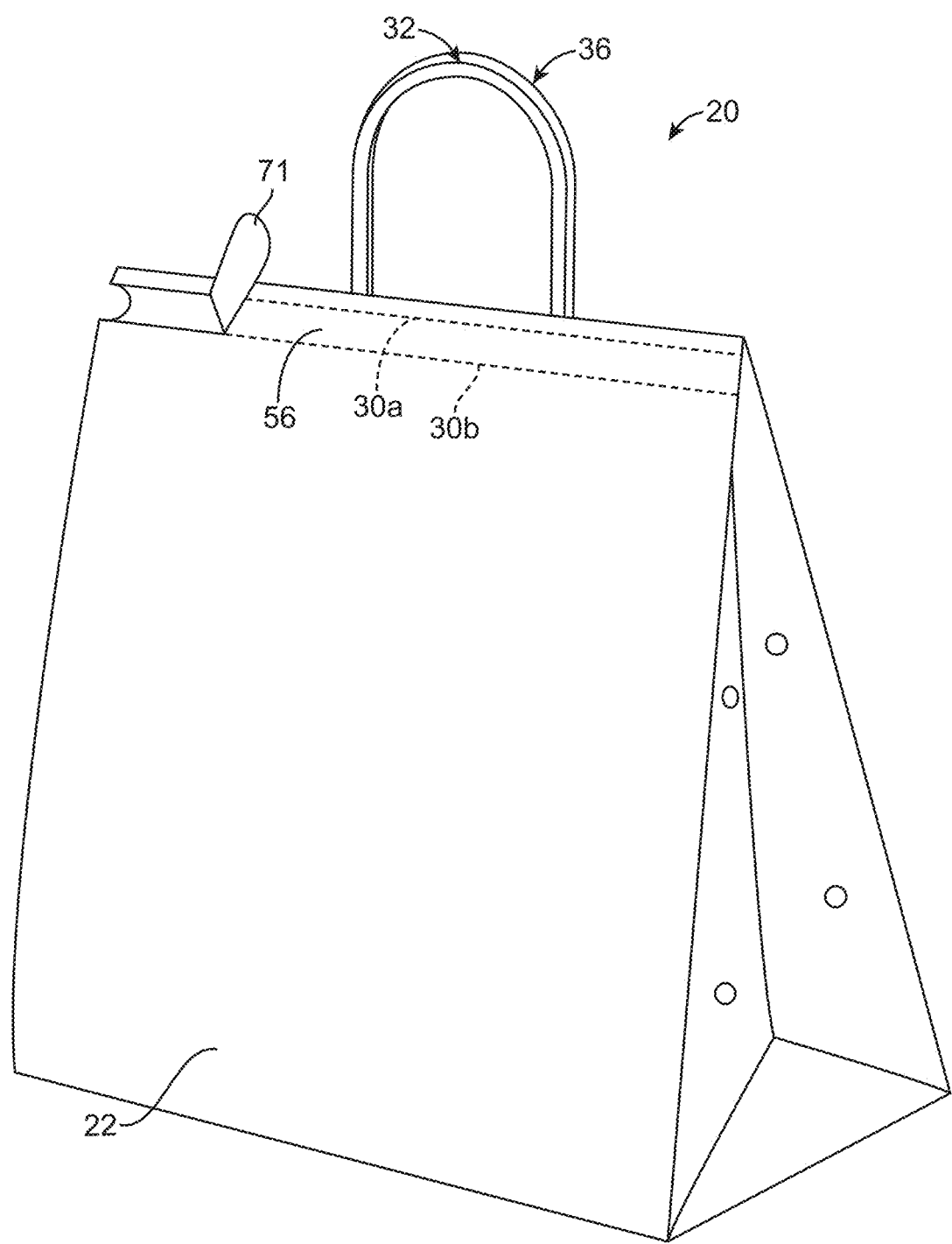
FIG. 21 is a front perspective view of the bag assembly of FIG. 20, illustrating partial removal of a pull tab to aid opening of the bag assembly from the sealed condition.

A horizontal pre-fold line 70 (FIGS. 14, 19, 23 and 24) is provided just above the upper perforation 30a that functions as the dividing line between the first upper section 25 of the first panel 21 and the bottom of each closure section 47-49, enabling each closure section to be folded over the second edge 27 of the second panel 22 such that the adhesive of each closure section can be brought into contact with the exterior surface of the second panel 22, substantially sealing the bag opening in the sealed condition (FIGS. 20, 21).

In the previous embodiments, as mentioned above and as shown in FIGS. 1-13, the pull tab 56 and the respective perforations 30 have been positioned in, and integral with, the upper lateral portion 39. While there are many advantages of placing the pull tab 56 there, such as convenience and easy access to pull tab, the fold line at the base of the closure sections 47-49 to promote folding over the second edge 27 of the opposing second panel 22 was coincident with the upper perforation 30a. Moreover, either crease may at times weaken one or more of the perforations 30a, 30b, causing them to prematurely open or partially tear.

Referring back to FIG. 19, when the first upper section 25 of the first panel 21 and the second upper section 26 of the second panel 22 are aligned adjacent one another in the closed condition where the bag opening is closed, the upper perforation 30a of the pull tab 56 is oriented just below the opposed second edge 27 of the opposing second panel 22. The pre-fold line 70, however, is vertically oriented even with or just above the second edge 27 of the second panel 22.

Such relative vertical orientations of the pre-fold line 70 and the upper perforation 30a, to the second edge 27 promote folding of the closure sections 47-49 over the second edge 27 toward the sealed condition (FIGS. 20 and 21) ideally not creasing or folding the upper perforation 30a. This, of course, is due to the fact that the second edge 27 is vertically positioned just above the upper perforation 30a for contact in the closed condition and will moving the closure sections to the sealed condition. In one particular configuration, the upper perforation 30a is to be in the range of about 1 mm to about 10 mm below the second edge 27 of the opposing second panel 22 when aligned therewith in the closed condition, while the pre-fold line 70 is to be in the range of about 0 mm to about 10 mm above the second edge in the closed condition. It will be appreciated that multiple pre-fold lines could be included parallel to, and adjacent, one another.

It is becoming more common for state and/or city legislation to institute local ordinances that ban the use of single use plastic bags. Consequently, the use of any plastic materials in paper container construction is also not preferred, such as for instance, the addition of a plastic reinforcement backing in a pull tab that facilitate the tearing of a paper bag or cardboard box. Accordingly, when designing a functional pull tab 56 for a bag assembly stamped from a roll of paper or a single sheet of paper, without the use of any additional pull, it was determined that there were primarily three factors to consider. These variables are the weight (e.g., GSM) of the paper, the vertical width of the pull tab 56 and the perforation design.

The paper typically employed for grocery styled paper bags, and those utilized in the fast food or takeout food industry are of a greater strength than that of copy paper. Typical paper weight for the bag in the takeout food industry are typically in the range of 90 GSM to 110 GSM.

Accordingly, with a paper selected in the range between about 40 GSM and about 150 GSM (more preferably in a range of about 70 GSM to 140 GSM, and most preferably in a range of about 90 GSM to 110 GSM), the vertical width ($W_V$ in FIGS. 24-26) of the pull tab 56 is in the range of about 3 mm to about 15 mm. It has been observed that should the width $W_V$ of the pull tab 56 be too narrow, the pull tab may prematurely tear inside of the perforation lines prior to the completion of removal of the entire pull tab. Moreover, the pull tab may be difficult to grip as well as adversely affect the structural integrity thereof.

On the other hand, should the vertical width $W_V$ be too wide, uniform tearing along the perforations may again be compromised. Also with a vertical width too wide there would be unnecessary wasted paper and increased costs. Moreover, it may touch the handle patch on the inside of the bag to cause the handle position lower and handle length would be too short to carry.

Figure 25:
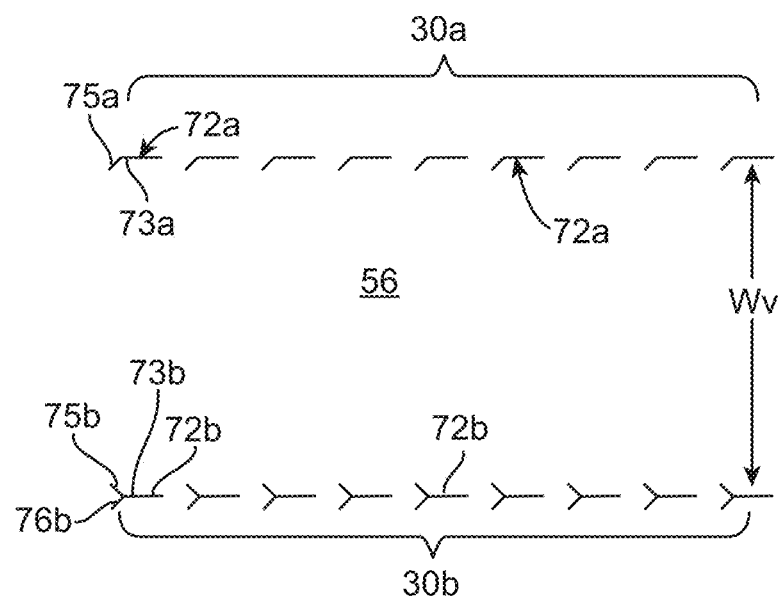
FIG. 25 is an enlarged, fragmentary, front elevation view of a pull tab of the first panel of FIG. 24, illustrating the specific shape of the perforation scoring.

Referring now to FIG. 25, an embodiment of the upper and lower perforation 30a, 30b designs are described in detail. With respect to the upper perforation 30a and the lower perforation 30b, to facilitate a clean, continuous and uniform tear along the perforation line, each individual perforation slit 72a, 72b includes a horizontal portion 73a, 73b and an interiorly extending angled portion 75a, 75b intersecting a left side distal end of the horizontal portion in this embodiment. It will be understood that "interiorly extending" refers to the angled portion 75a, 75b extending inward to the center of the pull tab 56 rather than outwardly away from the pull tab 56. It will also be understood that, in the illustrated embodiment, the angled portion 75a, 75b intersects a left side distal end of the horizontal portion 73a, 73b because the pull tab 56 is intended to be pulled by the user in a direction from left to right. In other embodiments, the angled portion 75a, 75b intersects a right side distal end of the horizontal portion 73a, 73b and the pull tab 56 is intended to be pulled by the user in a direction from right to left. Each angled portion 75a, 75b forms an obtuse angle with the corresponding horizontal portion 73a, 73b which is preferably in the range of about 135 Deg. to about 165 Deg.

Moreover, in the illustrated embodiment as shown in FIG. 25, each perforation slit 72b of the lower perforation line 30b is substantially Y-shaped. Each of the perforation slits 72b further includes an exteriorly extending angled portion 76b intersecting the left side distal end of the respective horizontal portion 73b, at the same intersection as the interiorly extending angled portion 75b. This exteriorly extending angled portion 76b is essentially a mirror image of the interiorly extending angled portion 75b, forming an identical obtuse angle with the corresponding horizontal portion 73b. Accordingly, FIG. 25 illustrates that the adjacent perforation slits provide a stacked appearance, and cooperate for directional removal of the pull-tab 56 in a single direction from left to right. Correspondingly, only one gripping tab 71 is required (FIGS. 23 and 24) for this embodiment. It will be understood that in other embodiments, the angled portions 75b, 76b intersect a right side distal end of the horizontal portion 73b and the pull tab 56 is intended to be pulled by the user in a direction from right to left.

The design of the perforation slits 72a, 72b shown in FIG. 25, where the angled portions 75a, 75b extend inwardly of the corresponding horizontal portions 73a, 73b, but away from the direction of the tear of the pull tab 56, is beneficial for achieving a smooth perforation cut when the pull tab is deployed. In this particular embodiment, the substantially Y-shaped slits 72b of the lower perforation line 30b aid in preventing tearing of the pull tab 56 when the pull tab 56 is deployed, especially if the pull tab 56 is pulled in a direction that is not parallel to the perforation lines 30a, 30b.

According to other embodiments, perforation slits of other configurations can be provided. In some embodiments, the perforation slits of both the upper and lower perforation lines 30a, 30b can be the same type of perforations, where the perforation slits of the upper perforation line 30a are aligned with and mirror images of perforation slits of the lower perforation line 30b. Thus, in accordance with one embodiment, all of the perforation slits of the upper and lower perforation lines 30a, 30b have the design of the perforation slits 72a. In accordance with another embodiment, all of the perforation slits of the upper and lower perforation lines 30a, 30b have the design of the perforation slits 72a. It will be understood that perforations of other designs can also be used. Thus, in accordance with still another embodiment, all of the perforation slits of the upper and lower perforation lines 30a, 30b have simply a horizontal portion. In all of these embodiments, a plastic strip 59 can be provided between the parallel perforation lines 30a, 30b to facilitate the operation of the pull tab 56 for opening the bag assembly 20.

In addition to the paper weighting and the vertical width $W_V$ of the upper and lower perforations 30a, 30b, already described above, the spacing of the perforation slits from one another, the length of the horizontal portions 73a, 73b and the angled portions 75a, 75b thereof, the Y-shaped lower perforation slits 72b, and the obtuse angle therebetween all contribute to the ability to successfully and repeatably operate the pull tab 56.

Accordingly, with the weight GSM range of paper selected for the stamped sheet panels or the roll of paper of the bag assembly selected in the range of at least about 40 GSM to at least about 150 GSM, the preferred perforation slits 72a, 72b have: a horizontal portion 73a, 73b in the range of at least about 0.5 mm long to at least about 8 mm long; angled portions 75a, 75b, 76b in the range of at least about 0.5 mm long to at least about 8 mm long; and an obtuse angle there between of at least about 135 Deg. to at least about 165 Deg. Finally, the spacing between adjacent perforations slits 72a, 72b is in the range of at least about 0.5 mm to at least about 5 mm there between. Most preferably, with a selected paper weight of 90 to 110 GSM, the vertical width $W_V$ between the upper and lower perforations 30a, 30b is about 8 to 10 mm, the spacing between adjacent perforation slits 72a, 72b is about 1 mm with the horizontal portion 73a, 73b of about 1 mm while the angled portions 75a, 75b, 76b is about 0.5 mm. Finally, the obtuse angle there between is about 135 Deg.

Based on the design of the perforations in the embodiment of FIG. 25, the pull tab will commonly be on the left side to pull from left to right (FIG. 24). Should the design of the perforations be reversed, the pull tab will commonly be on the right side to pull from right to left. It will be appreciated that other perforation designs can be implemented that can be pulled from left to right and from right to left.

To assure that the pull tab 56 can be removed in an unencumbered manner irrespective of the pull tab variables described, the vertical adhesive strip 80 employed to adhere the first panel side edge 81 to the side gusset 50 (FIG. 26) can terminate at a vertical height below the stamped pull tab 56. This assures that the rear portion of the pull tab 56 will not be adhered to the side gusset 50 when the pull tab is finally removed. Preferably adhesive strip 80 terminates a distance in the range of at least about 0 mm to at least about 5 mm below the lower perforation 30b, and most preferably about 0 mm below. In alternative embodiments, the adhesive strip 80 can extend almost to the height of the perforation line 30a and there would be a cut or perforation parallel to the longitudinal edge of the adhesive strip 80 and positioned inward from the adhesive strip 80 such that the pull tab 56 would tear off completely at the cut or perforation parallel to the longitudinal edge of the strip 80 when the pull tab 56 is pulled by a user.

Figure 26:
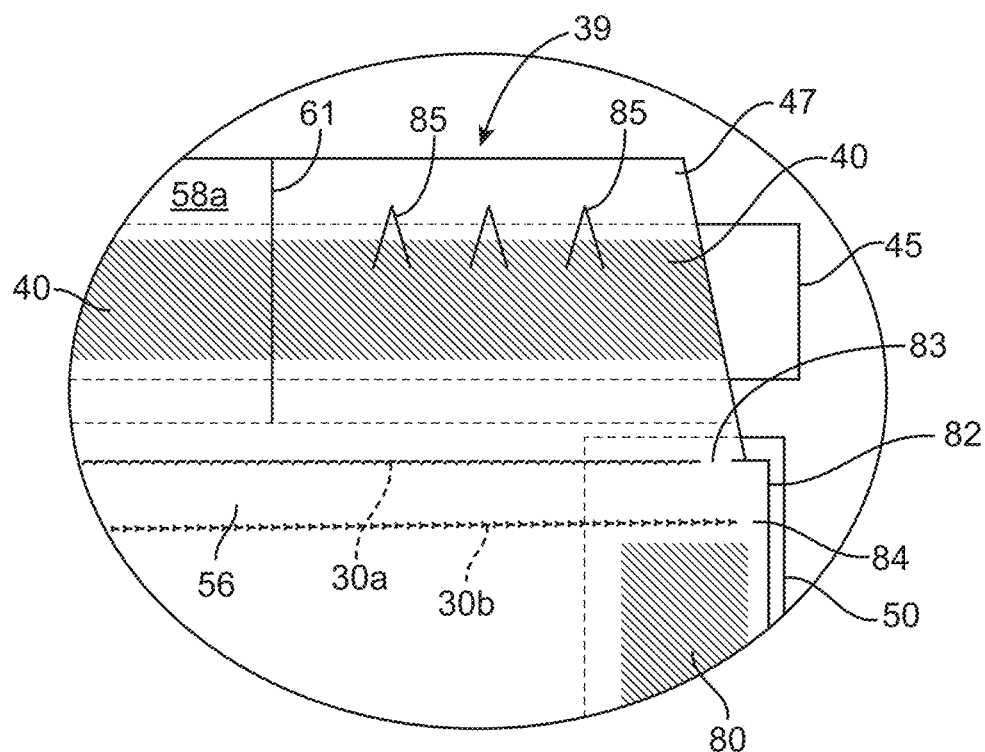
FIG. 26 is an enlarged, fragmentary, front elevation view of a right side of the upper portion of a first panel of FIG. 23 with the protective strip added.

In another configuration, the perforations 30a and 30b may not extend all the way to the gripping tab 71 and to the opposed distal end 82, opposite of the gripping tab 71. As best shown in FIGS. 24 and 26, opposed distal end 82 of pull tab 56 are void of the perforations 30a and 30b in these end gaps 83, 84 of at least about 1 mm to at least about 10 mm in length, and more preferably about 5 mm length. This void of perforations minimizes premature separation of the perforations 30a and 30b at both the gripping tab 71 end and the opposed distal end 82 of the pull tab 56.

Similar to the embodiment of FIGS. 1-11, each of the closure sections 47-49 of the upper lateral portion 39 includes tamper evident scoring 85 to exhibit the slightest evidence of tampering (FIGS. 14, 17-20 and 22-26). While the closure sections 47-49, in the sealed condition, adequately seal closed the opening of the bag assembly, it is always possible for someone to carefully manipulate and dislodge one or more of the closure sections back to the unsealed condition to gain access to the bag opening, and then subsequently reseal that closure section. While there may be only minor evidence of tampering, those unsuspecting customers may not even notice. Accordingly, the closure section scoring 85 will easily rip or tear, or even partial tear the scoring 85, clearly indicating evidence of tampering even if only a small amount.

Figure 22:
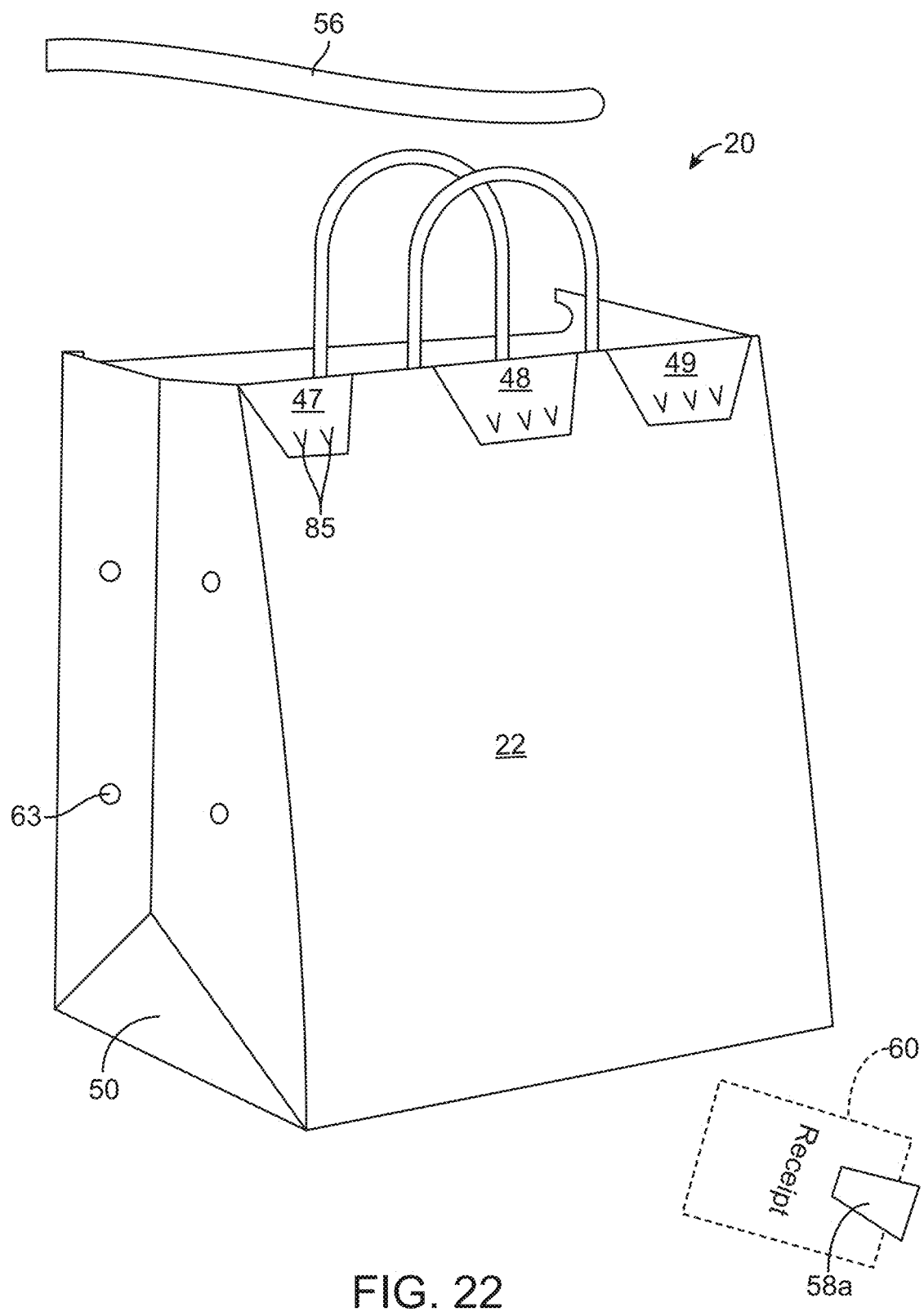
FIG. 22 is rear perspective view thereof, with the pull tab removed, and the bag assembly in an opened condition.

Preferably, the scoring is provided by a plurality of spaced-apart V-shaped scores 85, as clearly illustrated in FIGS. 20 and 22, when the closure sections 47-49 are folded over and sealed to the second sheet panel 22, when in the sealed condition. It will be appreciated, however, that virtually any scoring shape can be employed. For example, the scoring may be S-shaped, X-shaped, etc. The vertical or generally vertical scoring lines of the scoring 85, however, must extend across both the underlying adhesive strip 40 and across the lower portion in the sealed position of each closure section 47-49 where there is no underlying adhesive (i.e., where the portion of the closure section is not adhered to the second sheet panel 22 (FIGS. 20 and 26). Accordingly, when pulling apart the lower distal portions of anyone of the closure sections 47-49, where adhered to the second sheet panel 22, in the sealed condition, the closure portions thereof will commence tearing at the adhered scoring, revealing the slightest evidence of tampering.

Figure 27:
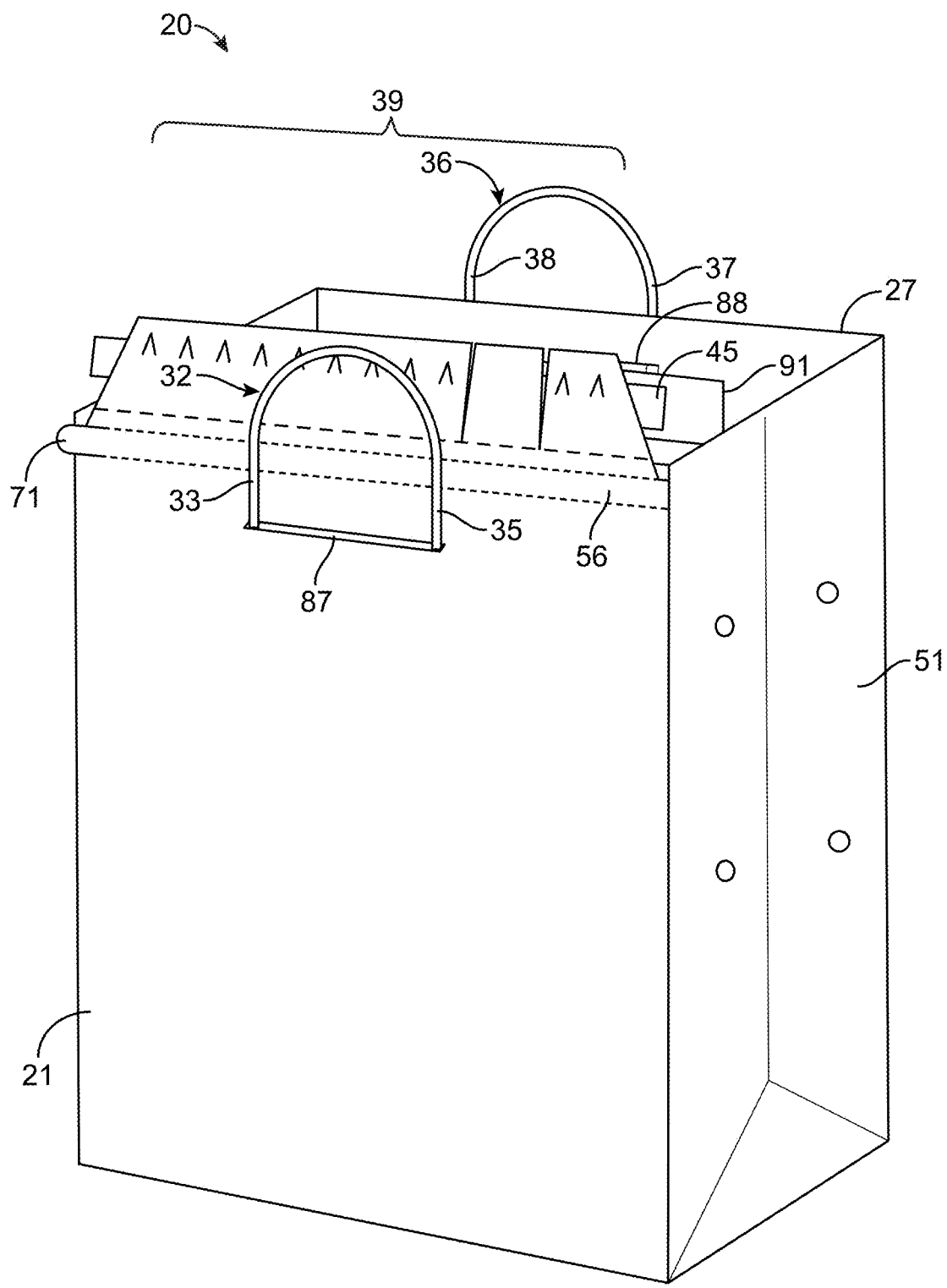
FIG. 27 is yet another alternative embodiment of the bag assembly of FIG. 14 with the respective handle members extending through respective leg passages in the respective first and second panels thereof.
Figure 28:
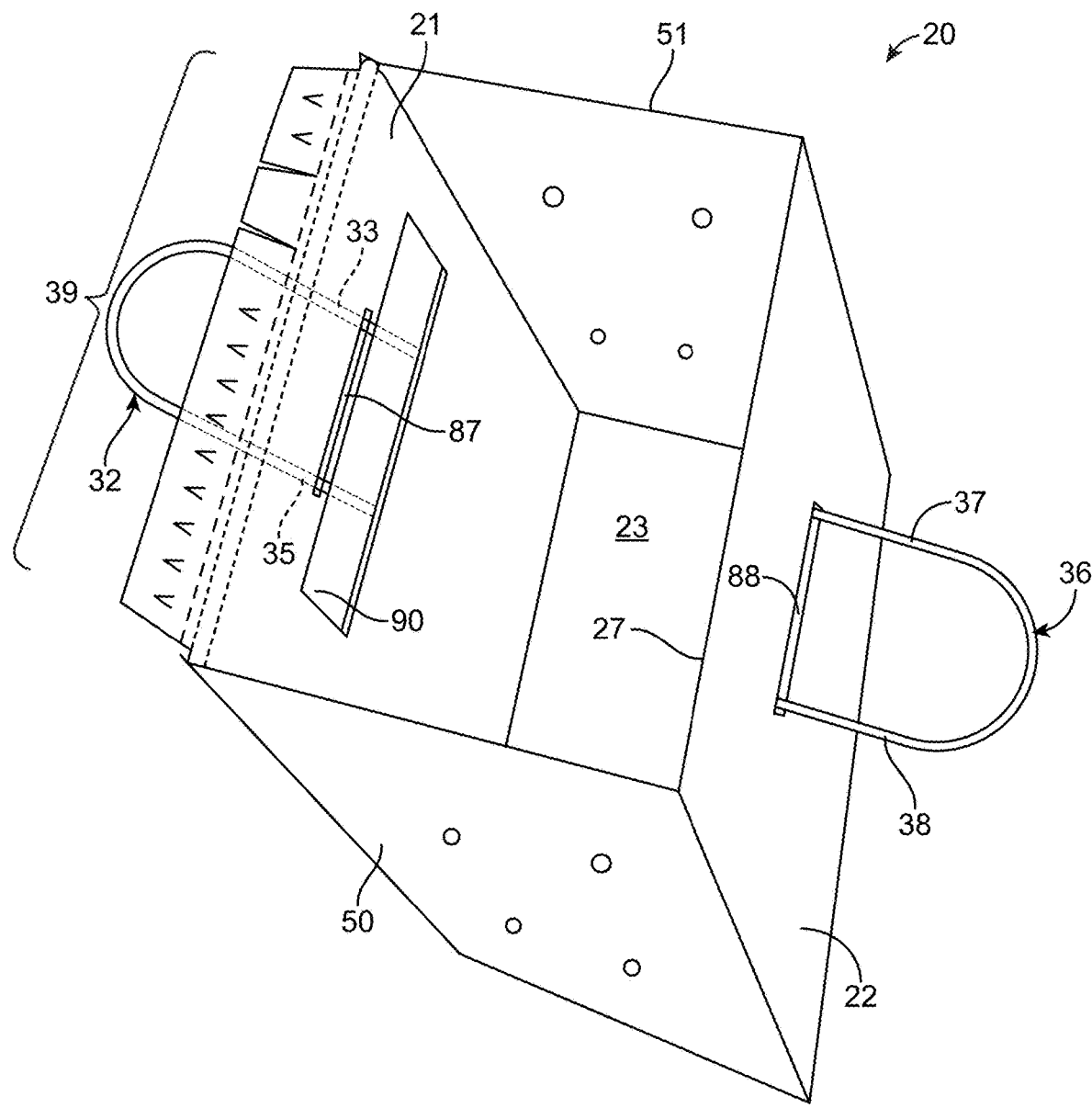
FIG. 28 is a top perspective view of the bag assembly of FIG. 27.

In yet another specific embodiment, as shown in FIGS. 27-29, this bag assembly 20 include handle members 32, 36 that have spaced-apart leg portions 33, 35 and 37, 38 that are positioned through respective leg passage 87, 88 extending through the first panel 21 and second panel 22. This enable the distal ends of the respective handle leg portions 33, 35 and 37, 38 to be interior mounted to the interior walls of the respective first and second panel, via a mounting strip 90, 91 for instance (FIGS. 27 and 28). Accordingly, the upper loop portions of the handles 32, 36 are oriented along the exterior of the respective first and second panel 21, 22, while the corresponding leg portions 33, 35 and 37, 38 thereof are aesthetically mounted to the interior of the panels.

In this configuration, however, since the loop portions of the handles 32, 36 extend outside of the respective first and second panels 21, 22, on both sides thereof, the upper lateral portion 39 that is to be folded over the second edge 27 of the second panel 22 does not need to accommodate the legs portions 33, 35 and 37, 38 of the handles. In other words, the leg portions can just be bent out of the way so as not interfere with the sealing of the single, continuous upper lateral portion 39.

It will be appreciated that FIGS. 27 and 28 best illustrate this embodiment with the pull tab 56 positioned below the upper lateral portion 39 in a manner similar to the embodiments of FIGS. 14-22. Finally, while the leg passages 87, 88 for the passage of the handle leg portions 33, 35 and 37, 38 are illustrated as a single, elongated, continuous slit, they could be provided by multiple passages that each accommodate a respective leg portion therethrough.

Figure 31:
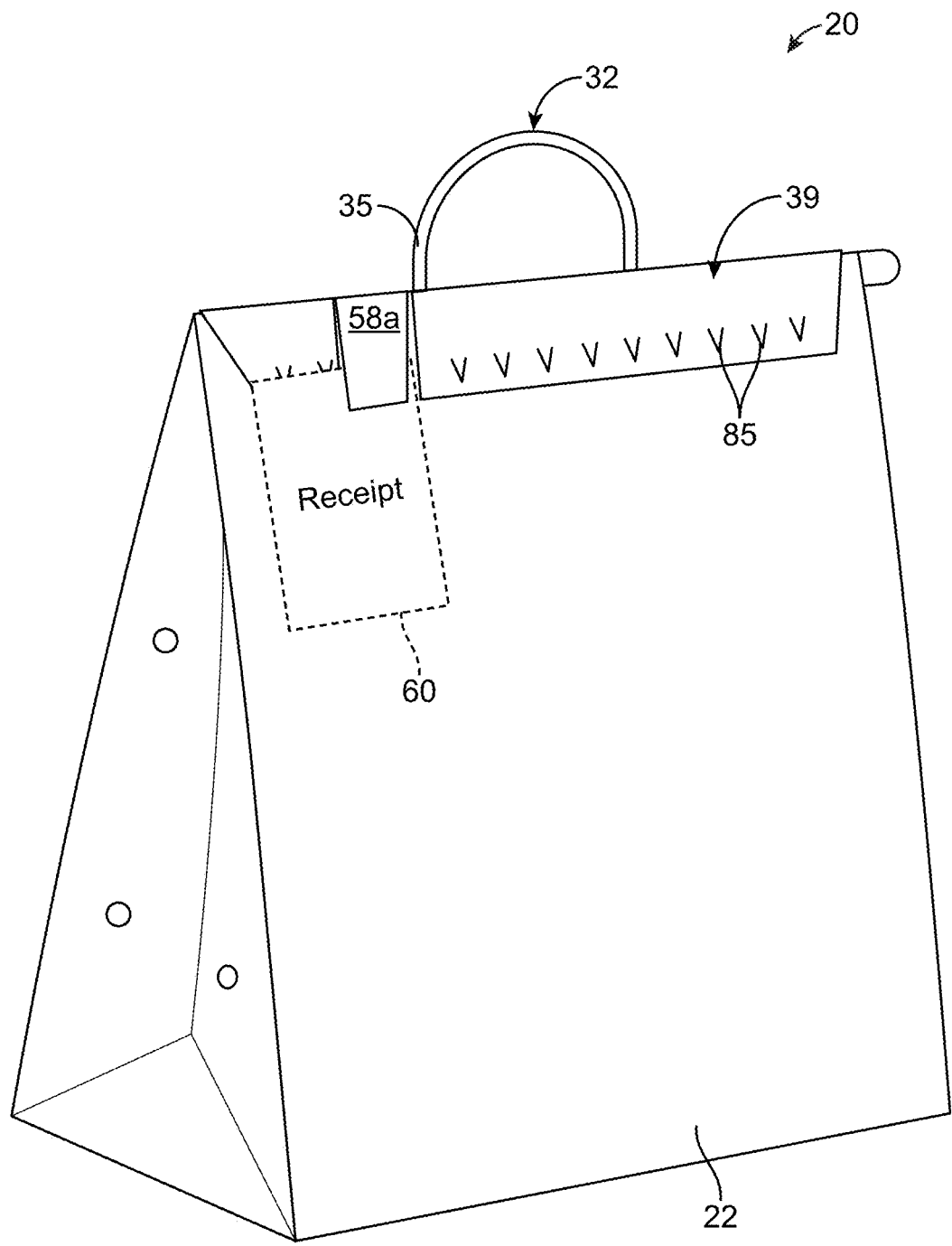
FIG. 31 is a rear perspective view thereof with the foldable closure sections of the upper lateral portion in a sealed condition while a note tab thereof is moved into adhered contact with a note.

Referring now to FIGS. 30 and 31, another alternative embodiment similar to that of FIGS. 27-29 but having only a single handle 32. Hence, the upper lateral portion 39 can be folded over the second edge 27 of the second panel 22 to the sealed condition (FIG. 31) without interference with the leg portions of the handle 32. Similar to all the previous embodiments, the note tab 58a is included for mounting of the note 60 thereto.

Figure 32:
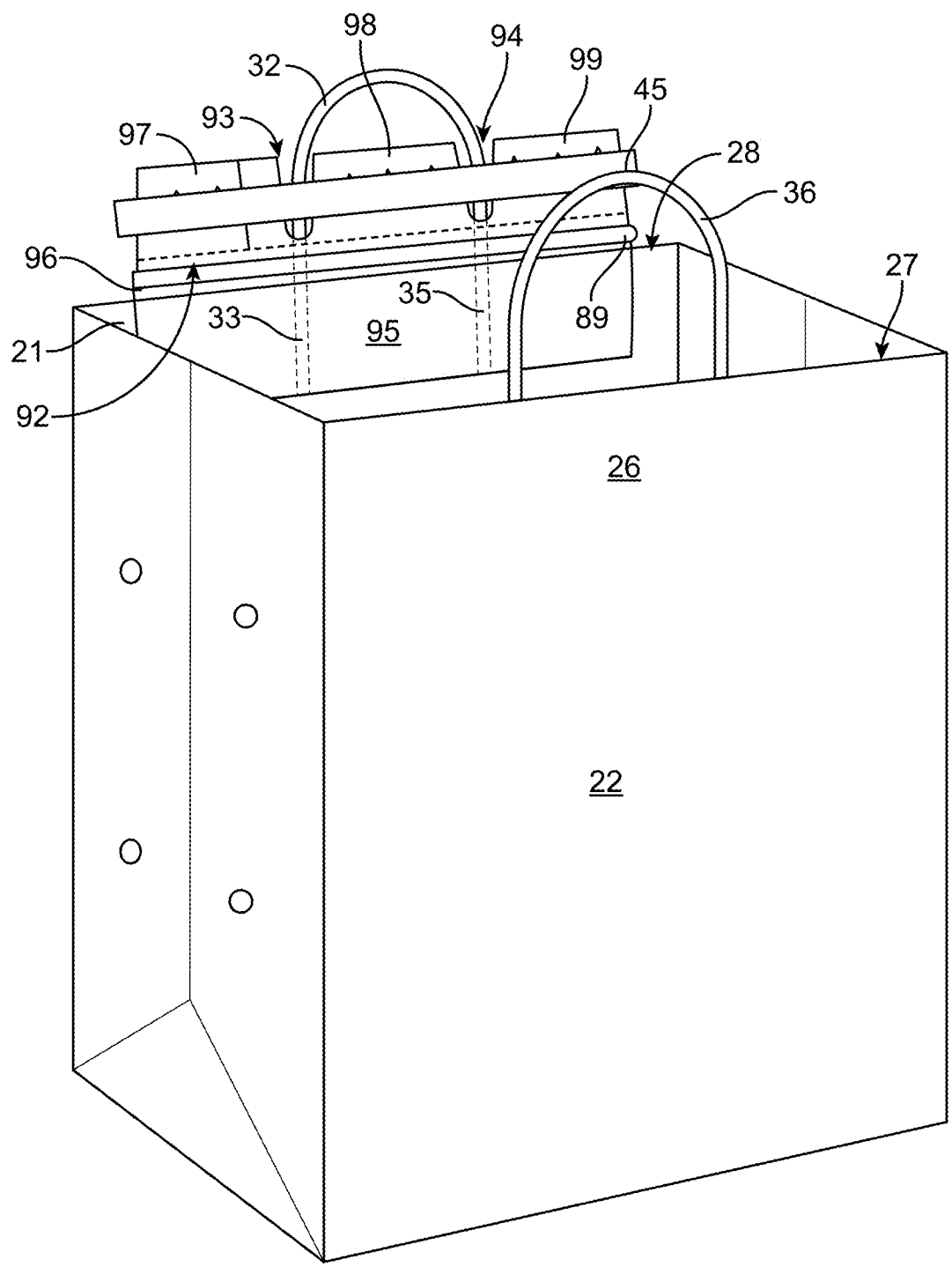
FIG. 32 is a rear perspective view of a sealable, handled bag assembly constructed in accordance with another embodiment, with an upper closure section mounter thereto, in an unsealed condition.
Figure 33:
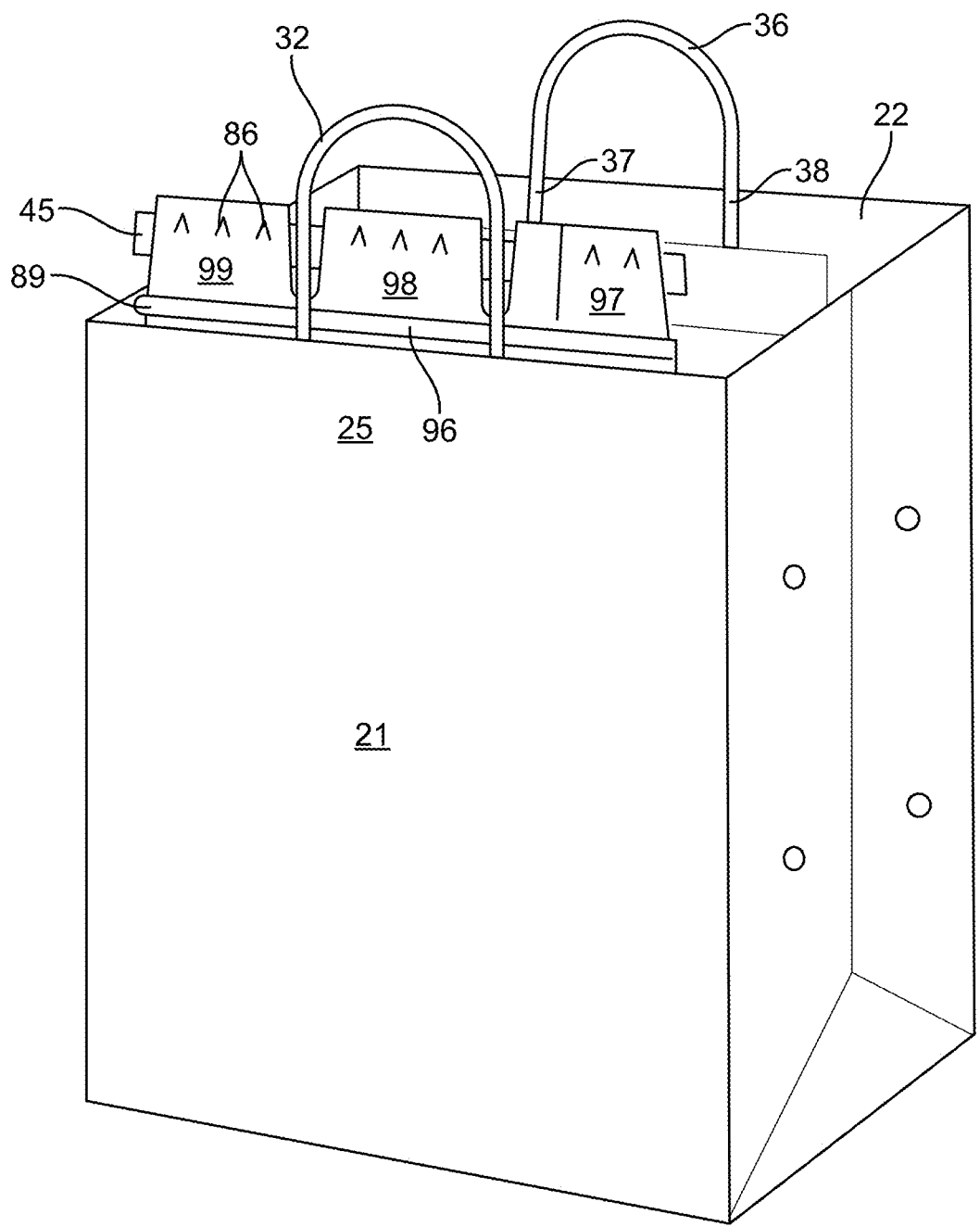
FIG. 33 is a front perspective view of the bag assembly of FIG. 32.

Another embodiment of the bag assembly is described with reference to FIGS. 32-38. According to this embodiment, there is an upper lateral portion 95 that is adhered to the interior surface of the first upper section 25 of the first sheet-like panel 21 and extends above the first upper section 25, as shown in FIG. 32. The adhesion of the upper lateral portion 95 to the first upper section 25 also serves to secure the first handle 32 to the first sheet-like panel 21. As shown in FIG. 32, the first leg portions 33, 35 of the first handle 32 are positioned between the first sheet-like panel 21 and the upper lateral portion 95. The second handle 36 includes a pair of second leg portions 37, 38 which are mounted to the interior surface of the second panel 22. The second leg portions 37, 38 can be covered by a patch to prevent inadvertent detachment from the second panel 22. It will be understood that, as illustrated, the upper lateral portion 95 is narrower than the first and second panels 21, 22, but that, in other embodiments, the upper lateral portion 95 can be nearly as wide as the first and second panels 21, 22.

Figure 35:
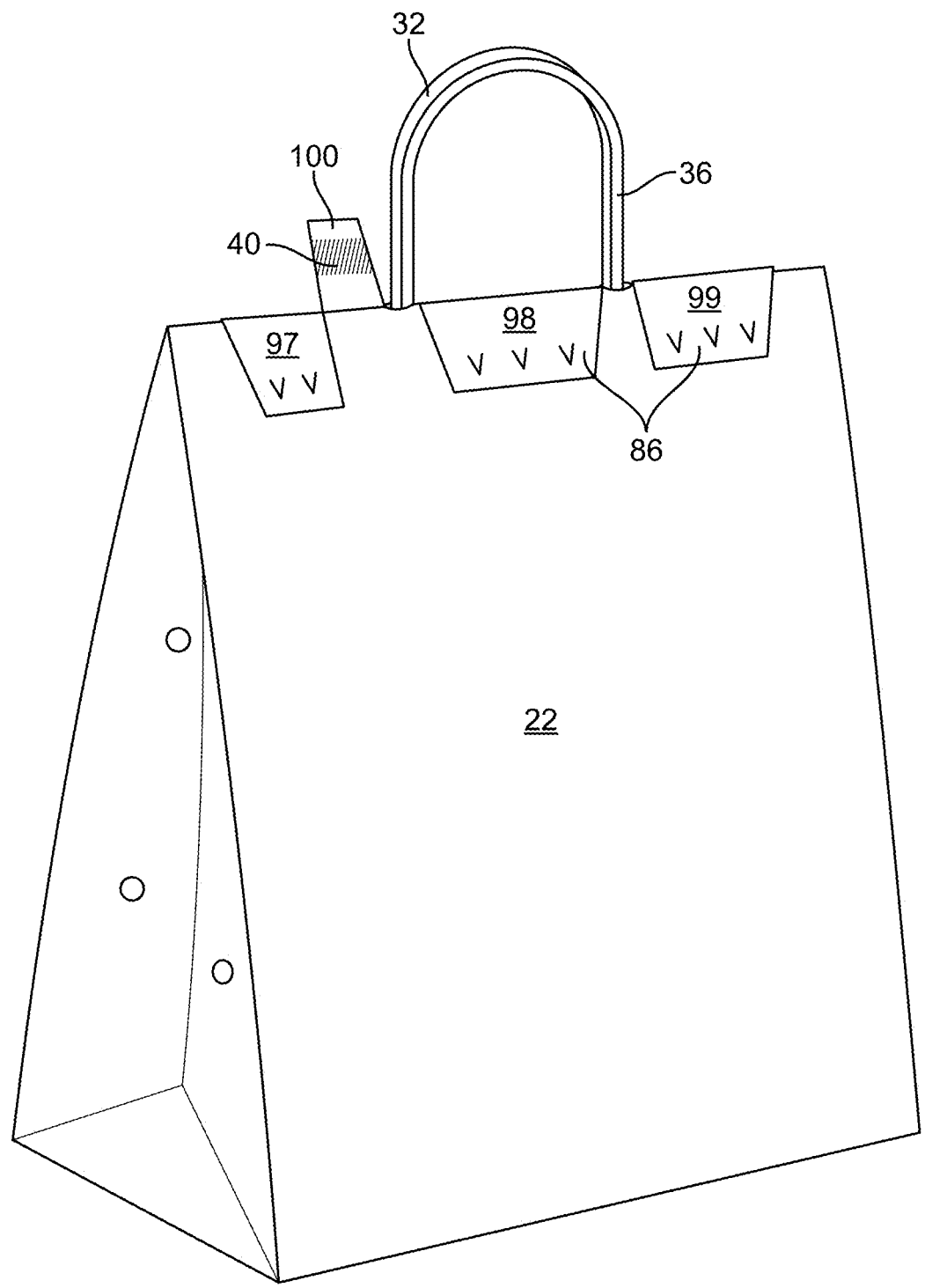
FIG. 35 is a rear perspective view of the bag assembly of FIGS. 32-34 in a sealed condition with the note tab unsealed.
Figure 36:
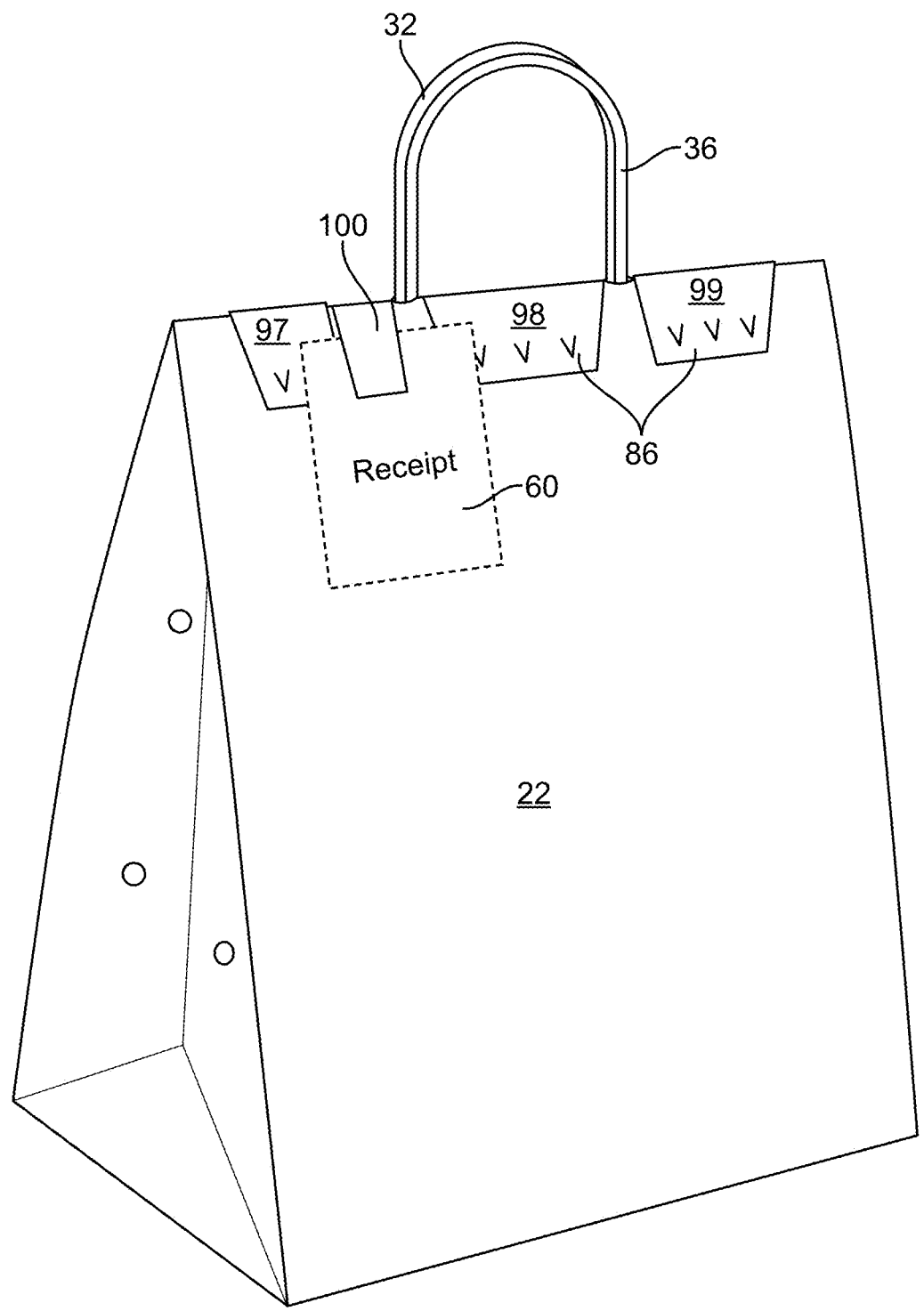
FIG. 36 is a rear perspective view of the bag assembly of FIGS. 32-35 in a sealed condition with the note tab securing a receipt.

At a distal portion of the upper lateral portion 95, a closure adhesive 40 is disposed on an interior surface thereof facing the second panel 22 when in the unsealed condition. The upper lateral portion 95 includes a pair of handle cutouts 93, 94 strategically aligned with the respective leg portions 33, 35 of the first handle 32, and tapering laterally outwardly from proximate the upper first edge 28 to a distal edge of the upper lateral portion 95. A removable protective strip 45 is provided that covers the adhesive 40, spanning the handle cutouts 93, 94. When the protective strip 45 is removed, and the panel upper sections 25, 26 are aligned in the closed condition, the upper lateral portion 95, essentially separated into three closure sections 97-99, can be folded over the second edge 27 of the second panel 22 such that the adhesive 40 is brought into contact with the exterior surface of the second panel 22, substantially sealing the bag opening in a sealed condition (FIGS. 35-36). In this arrangement, the leg portions 33, 35 and 37, 38 of the first and second handles 32, 36 are received through the respective handle cutouts 93, 94 of the upper lateral portion 95. Although the handle cutouts 93, 94 are shown as substantially V-shaped cutouts, it will be understood that other configurations of the cutouts are possible.

Figure 34:
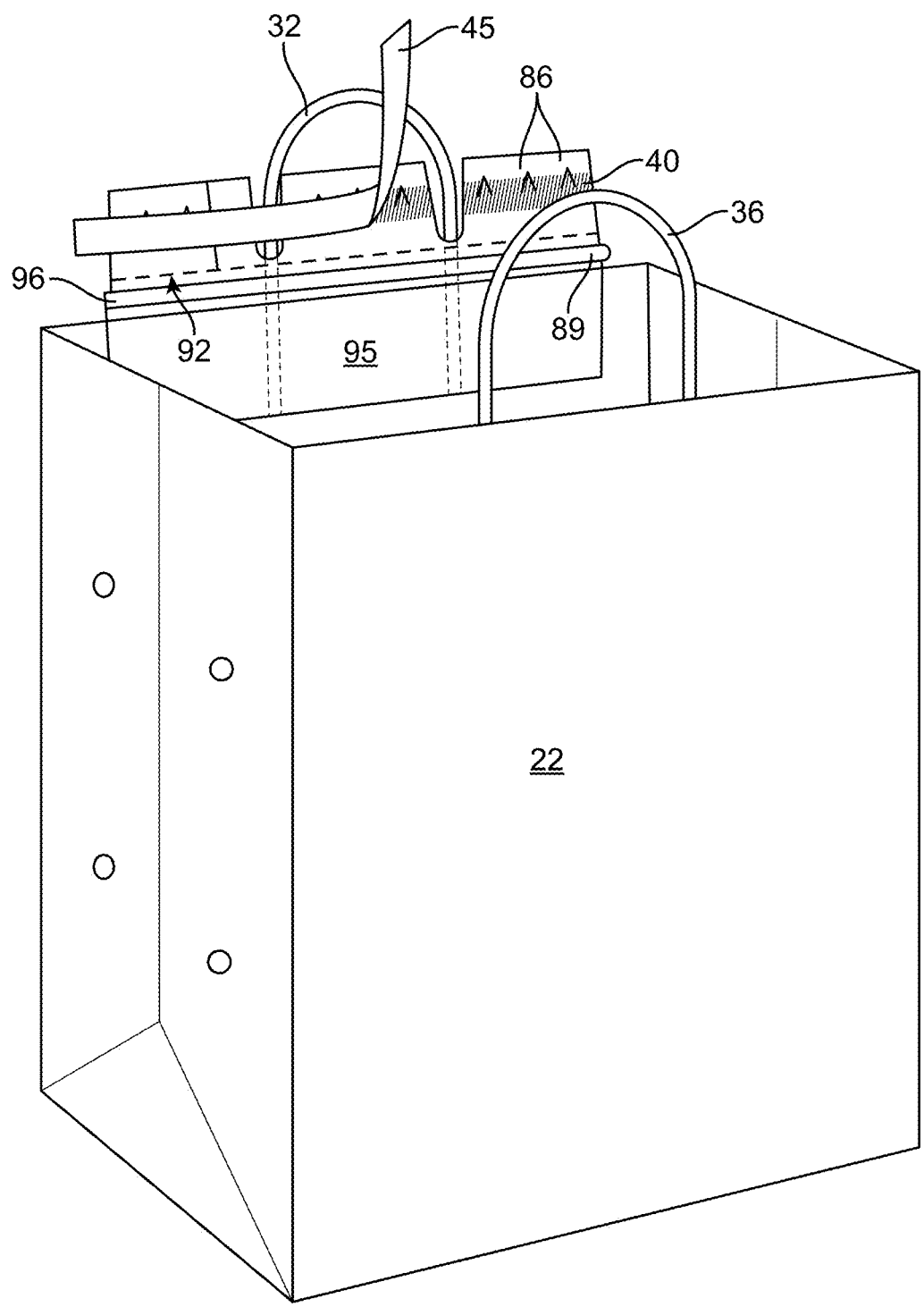
FIG. 34 is a rear perspective view of the bag assembly of FIGS. 32 and 33 showing the protective cover being peeled away.

As shown in FIGS. 32 and 34, a pre-fold line 92 is provided on the upper lateral portion 95. The pre-fold line 92 is shown as a dashed line in FIGS. 32 and 34. The upper lateral portion 95 is configured to be folded along the pre-fold line 92 over the opposing second edge 27 of the second sheet-like panel 22 when the opening into the bag interior of the bag is positioned in a closed condition, prior to sealing of the opening in a sealed condition (FIGS. 35-36).

To accommodate the lower leg portions 33, 35, 37, 38 of the opposed handles 32, 36 that are mounted to the corresponding first and second panels 21, 22, the upper lateral portion 95 includes handle cutouts 93, 94 aligned therewith. These aligned handle cutouts 93, 94 separate the upper lateral portion 95 into the three independently foldable closure sections 97, 98 and 99, enabling the upper lateral portion 95 to be folded over the corresponding second edge 27 of the second panel 22 despite the lower leg portions of the handle members. Accordingly, once the protective strip 45 is removed, the exposed adhesive 40 on each closure section 97, 98 and 99 can be adhered to the corresponding exterior surface of the second panel upper section 26, thereby sealing the bag closed in a sealed condition (FIGS. 35-36). The foldable closure sections 97, 98, 99 each extend sufficiently above the first edge 28 to easily extend and fold over the opposed second edge 27 when the opposed upper sections 25, 26 of the first and second panel 21, 22 are oriented in the closed condition.

To prevent inadvertent closure or contact of the closure adhesive 40 on the closure sections 97-99, the upper lateral portion 95 includes a manually removable protective strip 45. This protective strip 45 covers the adhesive 40 and horizontally spans the voids created by the handle cutouts 93, 94 of the upper lateral portion 95. In this manner, the protective strip 45 can be removed as a single unit rather than removing three separate units. This significantly reduces the time and effort required to remove the protective strip 45 during sealing of the bag assembly.

Figure 37:
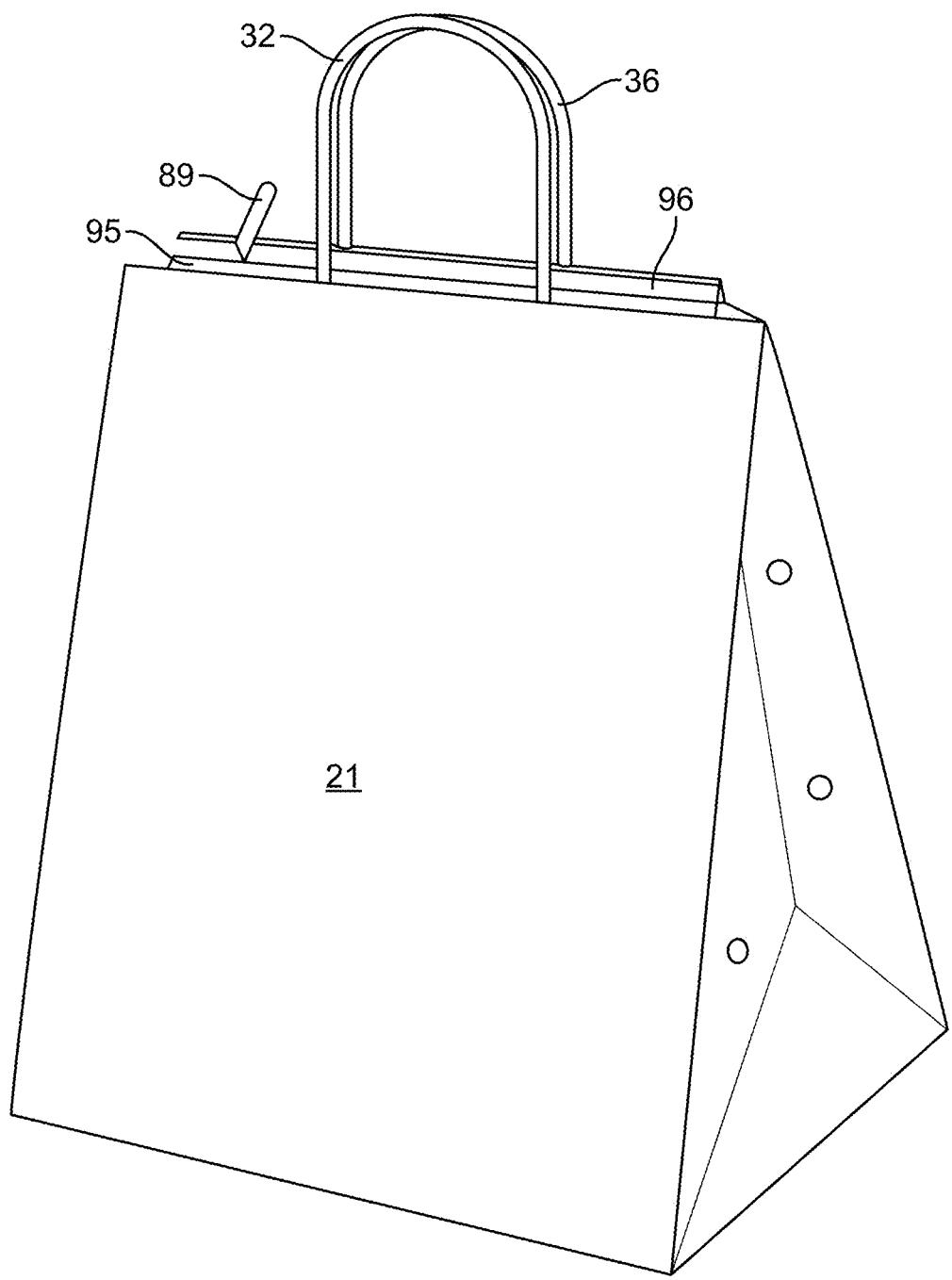
FIG. 37 is a front perspective view of the bag assembly of FIGS. 32-36 with the pull tab partially opening the bag assembly.

In this embodiment, the pre-fold line 92 is provided just above a pull tab 96 and the upper line of perforations along the upper edge of the pull tab 96. The pull tab 96 is positioned above the upper edge 28 of the first sheet-like panel 21 to facilitate opening of the bag assembly from the sealed condition (FIGS. 35 and 36). The pull tab 96 can be provided with a gripping tab 89 at one end or both opposed ends. In this embodiment, a plurality of perforations, score marks, cuts, etc. are created along the top and bottom edges of the pull tab 96 to aid tearing thereof when a sufficient force is applied to the pull tab 56 (FIG. 37). Preferably, a pair of parallel perforations are provided which run generally along the longitudinal axis of the connecting seam pull tab 96. By fully separating the pull tab 96 (FIG. 38) from the bag assembly or merely cutting one row of perforations, the bag assembly can be moved to the open position to access the contents. It will be appreciated, of course, that any unauthorized breakage or tearing of the perforations easily show any evidence of tampering due to visual separation of the scoring or perforations should tampering of the bag assembly be attempted.

One of the outer closure sections 97, 99 can include a note tab 100 which is configured to secure a note 60 or the like, such as a purchase receipt, order ticket or pick ticket to the bag assembly. As shown in FIGS. 35 and 36, the respective outer closure section 97 includes a dividing slit that divides the closure section 97 into two portions, one of which creates the note tab 100. While either divided portion of the closure section 97 can be employed as the note tab, preferably, the innermost divided portion, closer to the aligned leg portions 33, 37 and 35, 38 of the handles 32, 36, is used.

Figure 38:
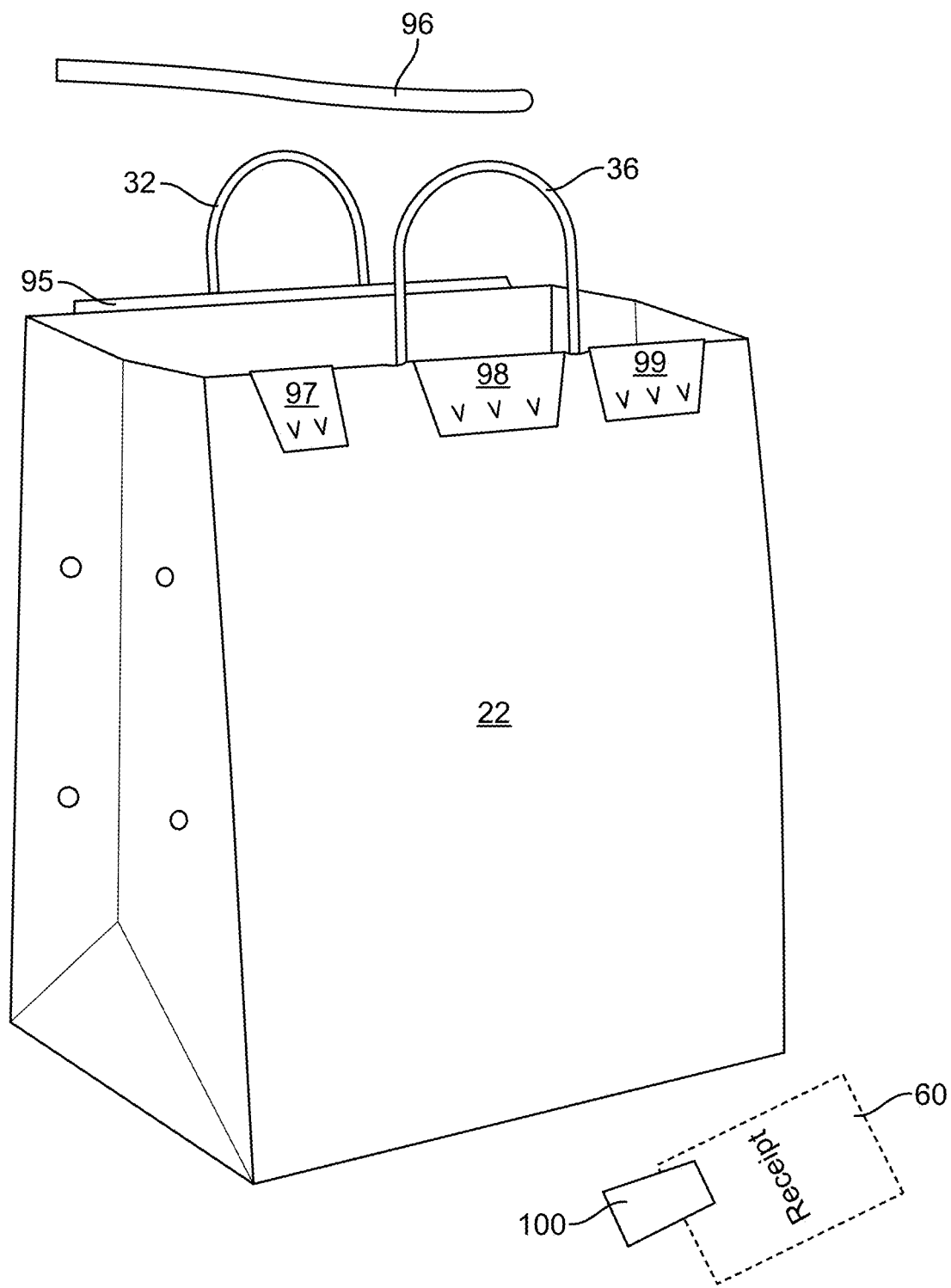
FIG. 38 is a rear perspective view of the bag assembly of FIGS. 32-27 with the pull tab fully removed from the bag assembly.

The note tab 100 also includes the same closure adhesive 40 disposed on an interior surface thereof. Initially, when the protective cover 45 is removed from the closure adhesive 40, and the closure sections 97-99 are adhered to the second panel 22, in the sealed condition, the note tab 100 will not be adhered thereto in an unmounted condition. The note 60 can then be placed between the respective closure adhesive 40 of the note tab 100 and the exterior surface of the second panel 22, and the note 100 58a can be pushed into adhered contact with the note 60, in a mounted condition. Upon gripping of the gripping tab 89, removal of the pull tab 96 (essentially along the perforations) is accomplished as well as removal of the note tab 100 and mounted receipt or note 60 as shown in FIGS. 37 and 38. It will be noted that, in the illustrated embodiment, only one note tab 100 is incorporated along one of the outer closure sections 97, 99. However, a note tab 100 may also be provided by the middle closure section 98 if desired.

A plurality of small vent holes can be provided in the first and second panels 21, 22 and/or in the side gussets. These vent holes 63, which shown as circular, can be virtually any shape, or scoring. Such venting allows steam or the like emanating from the hot food containers so as to prevent over inflation of the sealed bag assembly or to prevent contained food from getting too soggy.

Each of the closure sections 97-99 of the upper lateral portion 95 includes tamper evident V-shaped scoring 86 to exhibit the slightest evidence of tampering. Preferably, the scoring is provided by a plurality of spaced-apart V-shaped scores 86. It will be appreciated, however, that virtually any scoring shape can be employed. For example, the scoring may be S-shaped, X-shaped, etc. The vertical or generally vertical scoring lines of the scoring 86, however, must extend across both the underlying adhesive strip 40 and across the lower portion in the sealed position of each closure section 97-99 where there is no underlying adhesive (i.e., where the portion of the closure section is not adhered to the second sheet panel 22. Accordingly, when pulling apart the lower distal portions of anyone of the closure sections 97-99, where adhered to the second sheet panel 22, in the sealed condition, the closure portions thereof will commence tearing at the adhered scoring, revealing the slightest evidence of tampering.

In some embodiments, an elongated plastic strip may be disposed and adhered to the backside of the pull tab 96. This plastic strip is significantly stronger than the range of heavy weighted paper applied in most conventional paper bags so as to allow the plastic strip to rip through the material of the pull tab 96. Hence, due to the robustness of such a plastic strip, perforations or scoring might not be necessary, or perhaps only need to be provided near the gripping tab to facilitate commencement of the tearing. Moreover, the pull tab 96 can be utilized to remove the unadhered portions of the upper lateral portion 95 from the bag assembly, reverting the bag assembly to a conventional handled bag, as shown in FIG. 38. As shown in FIG. 38, the closure sections 97, 98, 99 remain adhered to the second panel 22, and the pull tab 96 and note tab 100 can be torn off the bag assembly. Alternatively, the strip does not need to be formed of plastic, but rather a material that is stronger than the material of the upper lateral portion 95 that is designed to tear through the material of the upper lateral portion 95, such as a heavier weight paper and fibers formed of nylon, cotton, etc.

While the present invention has been described in connection with the preferred form of practicing it and modifications thereto, those of ordinary skill in the art will understand that many other modifications can be made thereto within the scope of the claims that follow. Accordingly, it is not intended that the scope of the invention in any way be limited by the above description, but instead be determined entirely by reference to the claims that follow.

What is claimed is:

1. A tamper-evident bag assembly, comprising:
   a first sheet-like panel having an interior surface and an exterior surface, the first sheet-like panel having an upper edge, wherein the first sheet-like panel includes a first upper section that includes an integrally formed upper lateral portion extending laterally above the upper edge, wherein an adhesive is disposed on an interior surface of a distal portion of the upper lateral portion;
   a first handle mounted to the upper section, wherein the first handle includes a pair of spaced-apart leg portions upstanding from the upper edge of the first sheet-like panel;
   wherein the upper lateral portion includes a pair of handle cutouts, wherein each cutout is aligned with a respective leg portion of the first handle and the handle cutouts divide the upper lateral portion into first, second, and third closure sections, wherein each of the closure sections can fold over the upper edge of the second sheet-like panel, and wherein at least one of the closure sections includes a dividing slit that divides the at least one closure section into two portions, wherein one of the two portions can be used to secure a note, receipt, or ticket to the bag assembly;
   a second sheet-like panel having an interior surface and an exterior surface, wherein the interior surface of the first sheet-like panel faces the interior surface of the second sheet-like panel, the second sheet-like panel having an upper edge, wherein the second sheet-like panel includes a second upper section, the first and second upper sections being movable between an opened position and a closed position; and
   a sheet-like bottom gusset coupled to bottom edges of the first and second panels, wherein respective interior surfaces of the first and second sheet-like panels and an interior surface of the bottom gusset collectively define a content-receiving region of the bag assembly.

2. The tamper-evident bag assembly as recited in claim 1, wherein the first sheet-like panel is directly joined with the second sheet-like panel at opposed panel side edges such that the first and second sheet-like panels have common side seams.

3. The tamper-evident bag assembly as recited in claim 1, wherein:
   the first and second sheet-like panels are joined by an opposed pair of sheet-like side gussets therebetween;
   the sheet-like bottom gusset is further coupled to bottom edges of the opposed pair of sheet-like side gussets; and
   respective interior surfaces of the first and second sheet-like panels, interior surfaces of the sheet-like side gussets, and an interior surface of the bottom gusset collectively define a content-receiving region of the bag assembly.

4. The tamper-evident bag assembly recited in claim 1, wherein the upper edges of the first and second sheet-like panels cooperate to at least partially define an opening of the bag assembly into the content receiving region extending between the opening, first and second sheet-like panels, and the bottom gusset.

5. The tamper-evident bag assembly as recited in claim 1, wherein the upper edges of the first and second sheet-like panels are oriented in opposed, adjacent relation to one another.

6. The tamper-evident bag assembly as recited in claim 1, further including a second handle mounted to the upper section of the second-sheet-like panel, wherein the second handle includes a pair of spaced-apart leg portions upstanding from the upper edge of the second sheet-like panel.

7. The tamper-evident bag assembly as recited in claim 1, wherein each of the handle cutouts tapers laterally outwardly from proximate the upper edge of the first sheet-like panel to a distal edge of the upper lateral portion.

8. The tamper-evident bag assembly as recited in claim 1, further comprising a removable protective strip that covers the adhesive.

9. The tamper-evident bag assembly as recited in claim 8, wherein a protective strip spans the handle cutouts.

10. The tamper-evident bag assembly as recited in claim 8, wherein when the protective strip is removed, and the first and second upper sections are aligned in the closed position, each of the three closure sections can be folded over the upper edge of the second sheet-like panel such that the adhesive is brought into contact with an exterior surface of the second sheet-like panel, thereby substantially sealing the opening in a sealed condition.

11. The tamper-evident bag assembly as recited in claim 10, wherein the leg portions of the first handle are received through the respective cutouts of the upper lateral portion in the sealed condition.

12. The tamper-evident bag assembly as recited in claim 1, further comprising a pull tab provided with a gripping tab at an end of a connecting seam between the first upper section of the first sheet-like panel and the upper lateral portion.

13. The tamper-evident bag assembly as recited in claim 12, further comprising a line of a plurality of perforations generally along a longitudinal axis of the connecting seam.

14. The tamper-evident bag assembly as recited in claim 13, wherein a pair of parallel lines of perforations run generally along the longitudinal axis of the connecting seam.

15. The tamper-evident bag assembly as recited in claim 12, further comprising a plastic strip adhered to a back of the connecting seam.

16. The tamper-evident paper bag assembly as recited in claim 12, wherein the first sheet-like panel, second sheet-like panel, and sheet-like bottom gusset are formed from a paper material having a weight in a range of about 40-150 GSM and the pull tab has a vertical width of about 3-15 mm.

17. The tamper-evident bag assembly as recited in claim 16, wherein the bag assembly further comprises scoring across the upper lateral portion.

18. A tamper-evident bag assembly, comprising:
a first sheet-like panel having an interior surface and an exterior surface, the first sheet-like panel having an upper edge, wherein the first sheet-like panel includes a first upper section that includes an integrally formed upper lateral portion extending laterally above the upper edge, wherein an adhesive is disposed on an interior surface of a distal portion of the upper lateral portion, and wherein a pull tab is integrally formed with the first upper section and oriented below the upper lateral portion, wherein the pull tab includes a gripping tab at an end of a connecting seam between the first upper section and the upper lateral portion;
a first handle mounted to the interior surface of the first sheet-like panel, wherein the first handle includes a pair of spaced-apart leg portions upstanding from the upper edge of the first sheet-like panel;
wherein the upper lateral portion includes a pair of handle cutouts, wherein each cutout is aligned with a respective leg portion of the first handle and the handle cutouts divide the upper lateral portion into first, second, and third closure sections;
a second sheet-like panel having an interior surface and an exterior surface, wherein the interior surface of the first sheet-like panel faces the interior surface of the second sheet-like panel, the second sheet-like panel having an upper edge, wherein the second sheet-like panel includes a second upper section, the first and second upper sections being movable between an opened position and a closed position; and
a sheet-like bottom gusset coupled to bottom edges of the first and second panels, wherein respective interior surfaces of the first and second sheet-like panels and an interior surface of the bottom gusset collectively define a content-receiving region of the bag assembly.

19. The tamper-evident bag assembly as recited in claim 18, further comprising:
a horizontal pre-fold line along the upper edge of the first sheet-like panel; and
a plurality of perforations arranged in a first line below the horizontal pre-fold line.

20. The tamper-evident paper bag assembly as recited in claim 19, wherein each of the plurality of perforations comprises a horizontal portion and an angled portion intersecting a distal end of the horizontal portion, wherein each angled portion forms an obtuse angle with its corresponding horizontal portion.

21. The tamper-evident bag assembly as recited in claim 20, further comprising a plurality of perforations in a second line parallel and below the first line.

22. The tamper-evident bag assembly as recited in claim 21, wherein each perforation in the first line is aligned with and a mirror image of a perforation in the second line.

23. The tamper-evident bag assembly as recited in claim 18, wherein the first and second sheet-like panels and the sheet-like bottom gusset are formed of paper.

24. The tamper-evident bag assembly as recited in claim 18, wherein the first and second sheet-like panels and the sheet-like bottom gusset are formed of plastic.

25. The tamper-evident bag assembly as recited in claim 18, further comprising:
a plastic strip adhered to a back of the connecting seam.

26. A tamper-evident bag assembly, comprising:
a first sheet-like panel having an interior surface and an exterior surface, the first sheet-like panel having an upper edge, wherein the first sheet-like panel includes a first upper section;
a first handle having a pair of spaced-apart leg portions;
an upper lateral portion that is adhered to the interior surface of the first upper section and extends laterally above the upper edge of the first sheet-like panel, wherein an adhesive is disposed on an interior surface of a distal portion of the upper lateral portion and the upper lateral portion adheres the first handle to the interior surface of the first upper section with the pair of spaced-apart leg portions positioned between the first sheet-like panel and the upper lateral portion;
a second sheet-like panel having an interior surface and an exterior surface, wherein the interior surface of the first sheet-like panel faces the interior surface of the second sheet-like panel, the second sheet-like panel having an upper edge, wherein the second sheet-like panel includes a second upper section, the first and second upper sections being movable between an opened position and a closed position; and
a sheet-like bottom gusset coupled to bottom edges of the first and second panels, wherein respective interior surfaces of the first and second sheet-like panels and an interior surface of the bottom gusset collectively define a content-receiving region of the bag assembly.

27. The tamper-evident bag assembly as recited in claim 26, wherein the upper lateral portion includes a pair of handle cutouts, wherein each of the cutouts is aligned with a respective leg portion of the first handle and tapering laterally outwardly from proximate the upper edge of the first sheet-like panel to a distal edge of the upper lateral portion.

28. The tamper-evident bag assembly as recited in claim 26, wherein the upper lateral portion further comprises a pull tab extending across a width of the upper lateral portion, wherein the pull tab is above the upper edge of the first sheet-like panel.

29. The tamper-evident bag assembly as recited in claim 28, further comprising a line of a plurality of perforations generally along a top edge of the pull tab.

30. A tamper-evident bag assembly comprising:
a first sheet-like panel having an interior surface and an exterior surface, the first sheet-like panel having an upper edge, wherein the first sheet-like panel includes a first upper section that includes an integrally formed upper lateral portion extending laterally above the upper edge, wherein an adhesive is disposed on an interior surface of a distal portion of the upper lateral portion;

a first handle mounted to the upper section, wherein the first handle includes a pair of spaced-apart leg portions upstanding from the upper edge of the first sheet-like panel;

a second sheet-like panel having an interior surface and an exterior surface, wherein the interior surface of the first sheet-like panel faces the interior surface of the second sheet-like panel, the second sheet-like panel having an upper edge, wherein the second sheet-like panel includes a second upper section, the first and second upper sections being movable between an opened position and a closed position; and a sheet-like bottom gusset coupled to bottom edges of the first and second panels, wherein respective interior surfaces of the first and second sheet-like panels and an interior surface of the bottom gusset collectively define a content-receiving region of the bag assembly; and wherein the upper lateral portion includes a pair of handle cutouts, wherein each of the cutouts is aligned with a respective leg portion of the first handle and tapering laterally outwardly from proximate the upper edge of the first sheet-like panel to a distal edge of the upper lateral portion.

\* \* \* \* \*